United States Patent
Sudo

(10) Patent No.: US 12,552,380 B2
(45) Date of Patent: Feb. 17, 2026

(54) TRAVELING CONTROL APPARATUS

(71) Applicant: DENSO CORPORATION, Kariya (JP)

(72) Inventor: Takuma Sudo, Kariya (JP)

(73) Assignee: DENSO CORPORATION, Kariya (JP)

( * ) Notice: Subject to any disclaimer, the term of this patent is extended or adjusted under 35 U.S.C. 154(b) by 604 days.

(21) Appl. No.: 17/071,871

(22) Filed: Oct. 15, 2020

(65) Prior Publication Data

US 2021/0024067 A1    Jan. 28, 2021

Related U.S. Application Data

(63) Continuation of application No. PCT/JP2019/008155, filed on Mar. 1, 2019.

(30) Foreign Application Priority Data

Apr. 17, 2018   (JP) .................. 2018-078966

(51) Int. Cl.
*B60W 30/16*    (2020.01)
*B60W 30/12*    (2020.01)

(52) U.S. Cl.
CPC .......... *B60W 30/162* (2013.01); *B60W 30/12* (2013.01); *B60W 2552/53* (2020.02); *B60W 2554/4042* (2020.02); *B60W 2554/4045* (2020.02)

(58) Field of Classification Search
CPC ............... B60W 30/162; B60W 30/12; B60W 2552/53; B60W 2554/4042; B60W 2554/4045; B60W 30/14; B60W 30/188; G08G 1/16
See application file for complete search history.

(56) References Cited

U.S. PATENT DOCUMENTS

| | | | | |
|---|---|---|---|---|
| 2008/0059037 A1* | 3/2008 | Isaji | .................... | B60W 40/072 701/93 |
| 2019/0071091 A1* | 3/2019 | Zhu | ........................ | B60W 10/06 |
| 2019/0193739 A1 | 6/2019 | Tokimasa et al. | | |
| 2020/0010088 A1* | 1/2020 | Kokaki | ............... | B60W 30/188 |

FOREIGN PATENT DOCUMENTS

| | | | |
|---|---|---|---|
| DE | 10 2014 209 520 A1 | | 11/2015 |
| GB | 2 401 956 A | | 11/2004 |
| JP | H10166974 A | * | 6/1998 |
| JP | 2017-077829 A | | 4/2017 |

* cited by examiner

*Primary Examiner* — Ramya P Burgess
*Assistant Examiner* — Chanmin Park
(74) *Attorney, Agent, or Firm* — Maschoff Brennan

(57) ABSTRACT

A traveling control apparatus detects a target object that is present ahead in a travelling direction of an own vehicle and is not present in an own traffic lane or within an own vehicle width. This control apparatus detects a relative speed of the target object relative to the own vehicle along the travelling direction. The control apparatus sets a target acceleration of the own vehicle along the travelling direction. The control apparatus enables the own vehicle to travel at the set target acceleration and to pass a side of the target object. In response to the relative speed being equal to or greater in magnitude than a first threshold that is a predetermined negative value, the control apparatus sets the target acceleration to be within a range from the first threshold speed to a second threshold speed that is a predetermined negative value that is greater in magnitude than the first threshold speed.

14 Claims, 14 Drawing Sheets

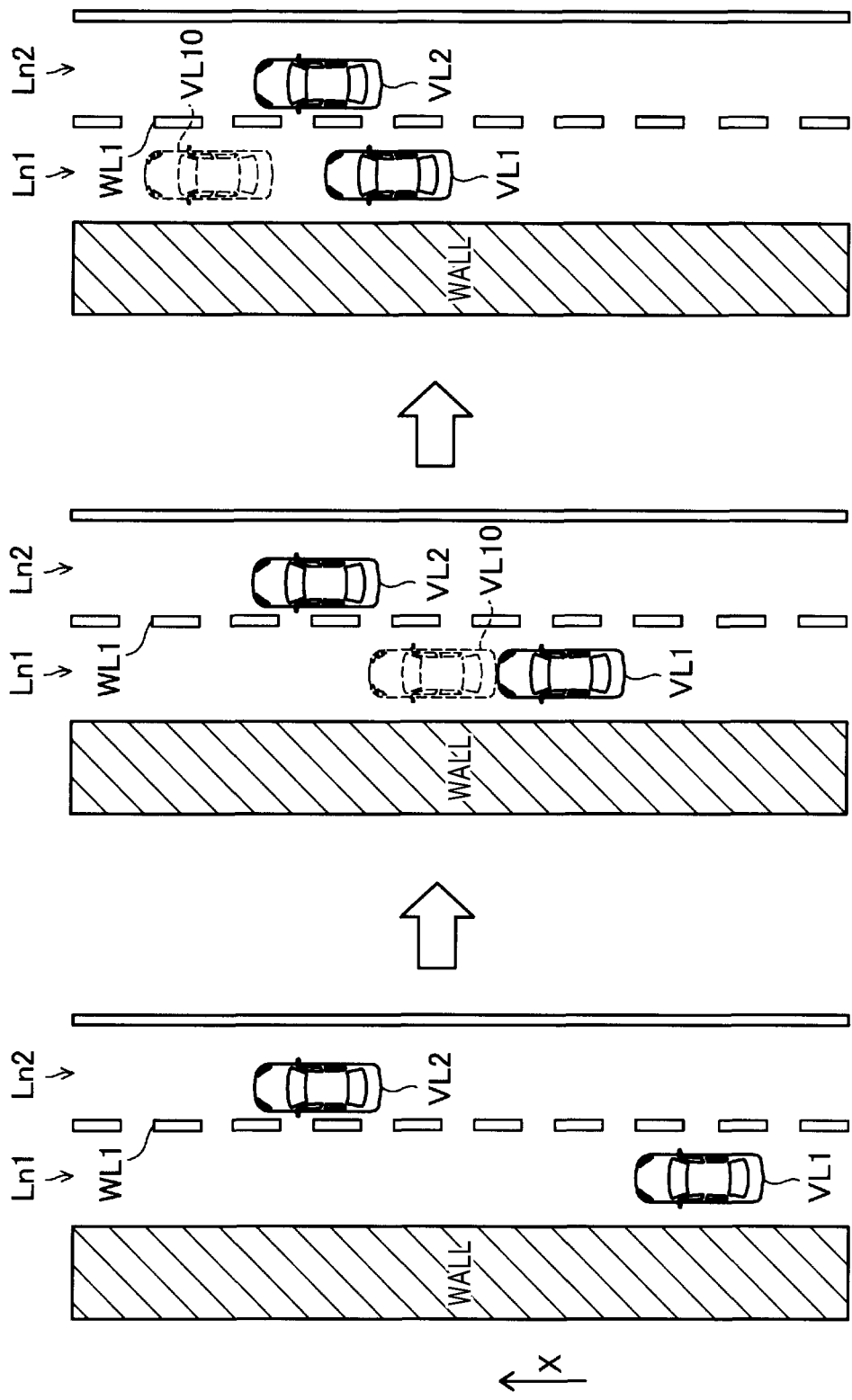

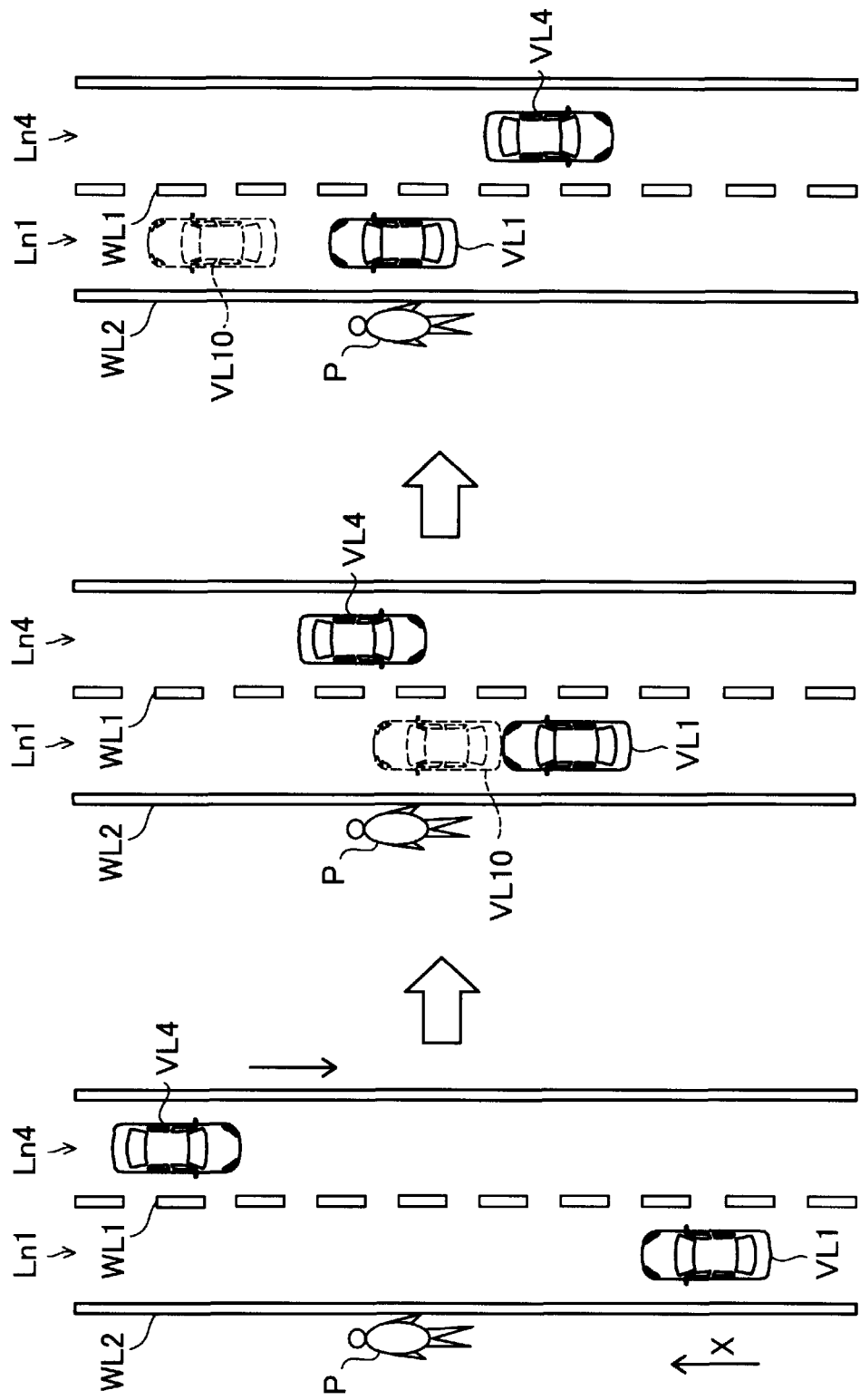

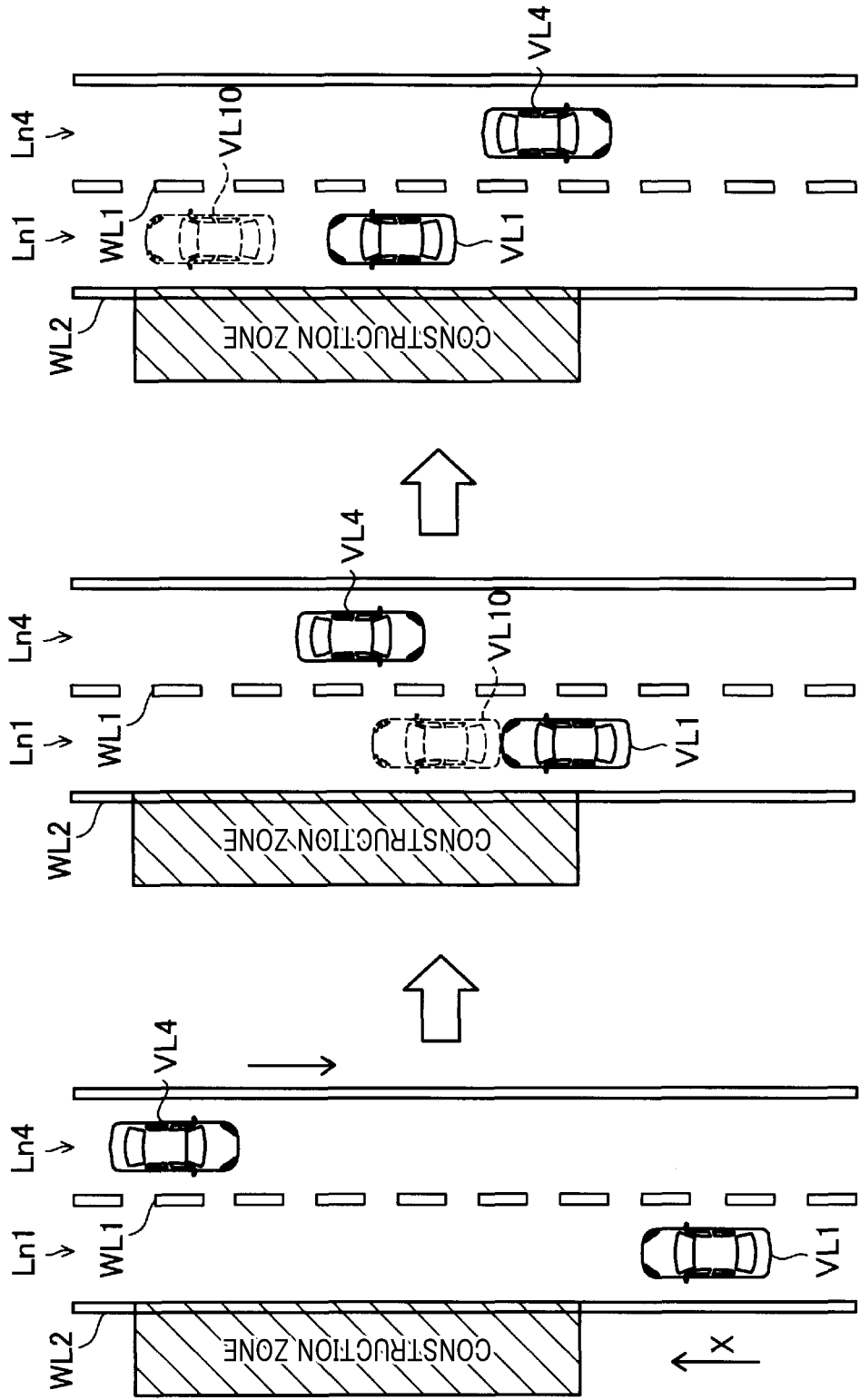

TRAVELING CONTROL APPARATUS

CROSS-REFERENCE TO RELATED APPLICATIONS

The present application is a continuation application of International Application No. PCT/JP2019/008155, filed Mar. 1, 2019, which claims priority to Japanese Patent Application No. 2018-078966, filed Apr. 17, 2018. The contents of these applications are incorporated herein by reference in their entirety.

BACKGROUND

Technical Field

The present disclosure relates to a traveling control apparatus that controls traveling of a vehicle.

Related Art

A traveling control apparatus that controls traveling of a vehicle has been known. The following technology is known in the traveling control apparatus. This technology sets a target speed of an own vehicle at which the own vehicle performs steering avoidance to pass a side of a target object that is present ahead in a traveling lane of the own vehicle.

SUMMARY

On aspect of the present disclosure provides a traveling control apparatus that controls traveling of a vehicle. The traveling control apparatus detects a target object that is present ahead in a travelling direction of an own vehicle and is not present in an own traffic lane or within an own vehicle width. The traveling control apparatus detects a relative speed of the target object relative to the own vehicle along the travelling direction. The relative speed is indicated by a negative value when the own vehicle approaches the target object and a positive value when the own vehicle moves away from the target object. The traveling control apparatus sets a target acceleration of the own vehicle along the travelling direction. The traveling control apparatus enables the own vehicle to travel at the target acceleration that is set and to pass a side of the target object. In response to the relative speed being equal to or greater in magnitude than a first threshold that is a predetermined negative value, the traveling control apparatus sets the target acceleration to be within a range from the first threshold speed to a second threshold speed that is a predetermined negative value that is greater in magnitude than the first threshold speed.

BRIEF DESCRIPTION OF THE DRAWINGS

In the accompanying drawings:

FIG. 12 is an explanatory diagram for explaining a manner in which the own vehicle passes the side of a target object;

FIG. 13 is an explanatory diagram for explaining a manner in which the own vehicle passes the side of a target object; and FIG. 14 is an explanatory diagram for explaining a manner in which the own vehicle passes the side of a target object.

DESCRIPTION OF THE EMBODIMENTS

Figure 1:
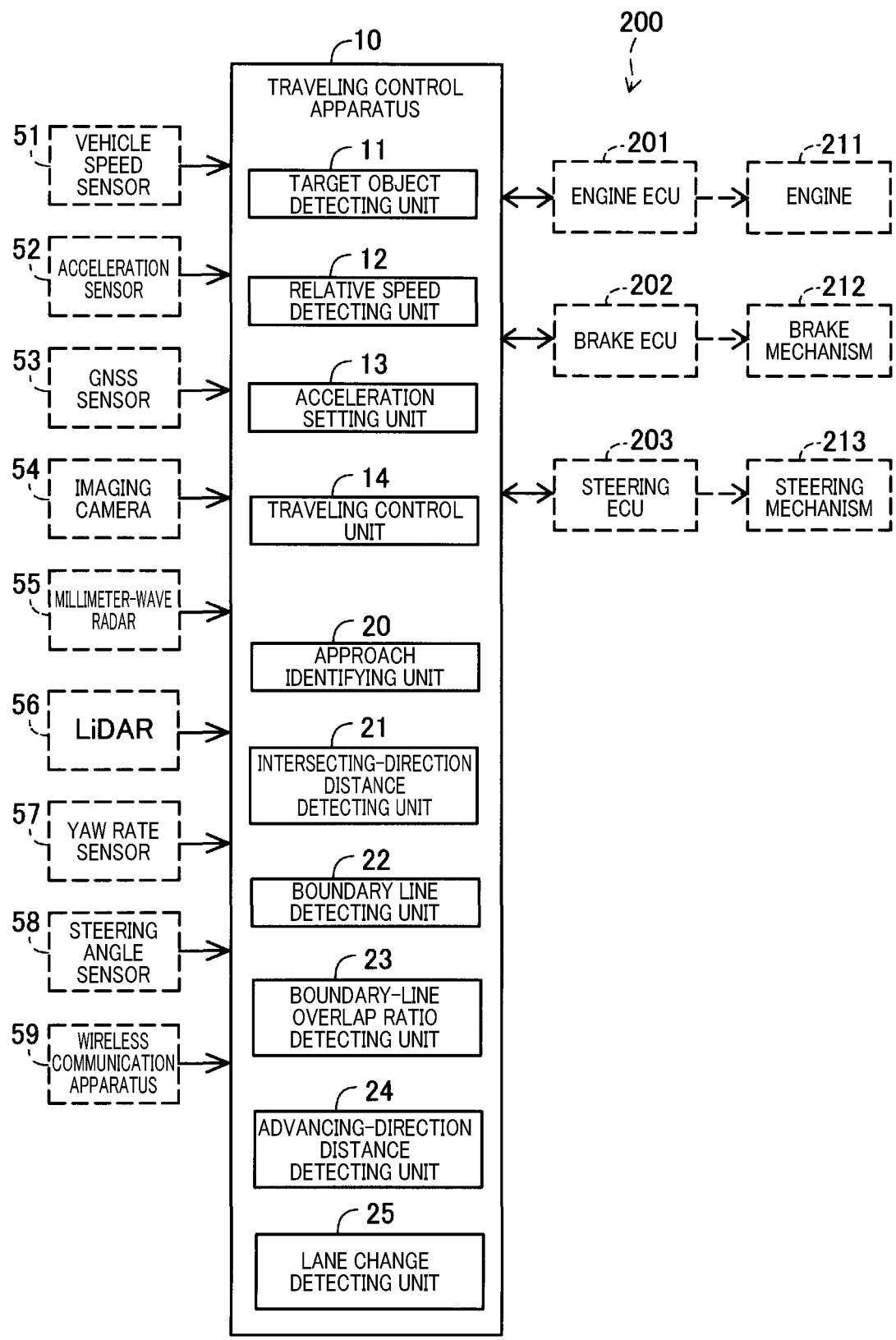
FIG. 1 is a block diagram of an overall configuration of a traveling control apparatus.

JP-A-2017-077829 discloses that, based on a type of a target object that is present ahead in a traveling lane of an own vehicle, a target speed of the own vehicle at which the own vehicle performs steering avoidance to pass a side of a target object is set.

In JP-A-2017-077829, the object is to avoid a target object that is present ahead in the traveling lane of the own vehicle. Therefore, a target object that is present in an area adjacent to the traveling lane of the own vehicle is not taken into consideration. Consequently, in a case in which a target object is present in the area adjacent to the traveling lane of the own vehicle, if the own vehicle travels at the target speed that is set and pass the side of the target object, a passenger may experience uneasiness as a result of the speed of the own vehicle being high.

In addition, brake override may be performed as a result of a driver experiencing uneasiness. Therefore, a technology that is capable of suppressing uneasiness that is experienced by a passenger when the own vehicle passes the side of a target object has been desired.

The present disclosure can be implemented according to an exemplary embodiment below.

The exemplary embodiment provides a traveling control apparatus that controls traveling of a vehicle. The traveling control apparatus includes: a target object detecting unit that detects a target object that is present ahead in a travelling direction of an own vehicle and is not present in an own traffic lane or within an own vehicle width; a relative speed detecting unit that detects a relative speed of the target object relative to the own vehicle along the travelling direction, the relative speed being indicated by a negative value when the own vehicle approaches the target object and a positive value when the own vehicle moves away from the target object; an acceleration setting unit that sets a target acceleration of the own vehicle along the travelling direction; and a traveling control unit that enables the own vehicle to travel at the target acceleration that is set and to pass a side of the target object. In response to the relative speed being equal to or greater in magnitude than a first threshold speed that is a predetermined negative value, the acceleration setting unit sets the target acceleration to be within a range from the first threshold speed value to a second threshold speed that is a predetermined negative value that is greater in magnitude than the first threshold speed.

In the traveling control apparatus according to the exemplary embodiment, in response to the relative speed being equal to or greater in magnitude than the first threshold speed that is a predetermined negative value, the acceleration setting unit sets the target acceleration to be within a range from the first threshold speed to the second threshold speed that is a predetermined negative value that is greater in magnitude than the first threshold speed. Therefore, the own vehicle can pass the side of a target object at a relative speed that is within a predetermined range. Uneasiness experienced by a passenger when the own vehicle passes the side of the target object can be suppressed.

The present disclosure can be implemented according to various embodiments. For example, the present disclosure can be implemented according to embodiments such as a vehicle that includes the traveling control apparatus, a traveling control method, or a computer program for actualizing the apparatus and method.

A. First Embodiment

A-1. Overall Configuration

A traveling control apparatus 10 according to an embodiment of the present disclosure, shown in FIG. 1, is mounted in a vehicle and controls traveling of the vehicle. According to the present embodiment, the vehicle in which the traveling control apparatus 10 is mounted is also referred to as an "own vehicle." The own vehicle according to the present embodiment is capable of being autonomously driven. In autonomous driving, engine control, brake control, and steering control are autonomously performed instead of being performed by a driver. The traveling control apparatus 10 performs traveling control by autonomous driving, described above, as traveling control of the own vehicle.

For example, in ordinary control, for example, the traveling control apparatus 10 enables the own vehicle to travel by performing engine control and brake control so as to become a preset speed that is set in the own vehicle or a tracking speed relative to a leading vehicle. Here, the own vehicle may be configured to be capable of switching between autonomous driving and manual driving. According to the present embodiment, the traveling control apparatus 10 is configured by an electronic control unit (ECU) in which a microcomputer and a memory are mounted.

The traveling control apparatus 10 is electrically connected to each of a vehicle speed sensor 51, an acceleration sensor 52, a global navigation satellite system (GNSS) sensor 53, an imaging camera 54, a millimeter-wave radar 55, light detection and ranging or laser imaging detection and ranging (LiDAR) 56, a yaw rate sensor 57, a steering angle sensor 58, and a wireless communication apparatus 59. The traveling control apparatus 10 acquires measurement values and communication content obtained by these sensors, and instructs an operation control apparatus 200 to perform control based on the measurement values and communication content.

The vehicle speed sensor 51 detects a speed of the own vehicle. The acceleration sensor 52 detects an acceleration of the own vehicle. For example, the GNSS sensor 53 is configured by a global positioning system (GPS) sensor and detects a current position of the own vehicle based on radio waves that are received from an artificial satellite that configures the GPS.

The imaging camera 54 faces outside the own vehicle and acquires at least a captured image of an area ahead of the own vehicle. A single-lens camera may be used as the imaging camera 54. In addition, a stereo camera or a multi-camera that is configured by two or more cameras may also be used.

The millimeter-wave radar 55 detects presence/absence of an object in a periphery of the own vehicle, a distance between the object and the own vehicle, a position of the object, a size of the object, a shape of the object, and a relative speed of the object relative to the own vehicle, using millimeter-wave-band radio waves. Here, the "object" that is detected by the millimeter-wave radar 55 is more accurately a collection of a plurality of detection points (target objects).

The LiDAR 56 detects the presence/absence of an object in the periphery of the own vehicle and the like using a laser. The yaw rate sensor 57 detects a yaw rate (rotation angular speed) of the own vehicle. The steering angle sensor 58 detects a steering-wheel steering angle of the own vehicle. The wireless communication apparatus 59 performs wireless communication with an intelligent transport system, inter-vehicle communication with another vehicle, and road-vehicle communication with a roadside wireless unit that is set in a road facility. As a result, state information related to a state of the own vehicle and a state of the surroundings can be exchanged with another vehicle and the like.

The operation control apparatus 200 is a functional unit that controls operation of the own vehicle. According to the present embodiment, the operation control apparatus 200 includes an engine ECU 201, a brake ECU 202, and a steering ECU 203.

The engine ECU 201 controls operation of an engine 211. Specifically, the engine ECU 201 controls an open/close operation of a throttle valve, an ignition operation of an igniter, an open/close operation of an intake valve, and the like by controlling various actuators (not shown).

The brake ECU 202 controls a brake mechanism 212. The brake mechanism 212 is composed of an apparatus group (actuator) that is related to brake control, such as a sensor, a motor, a valve, and a pump. The brake ECU 202 determines a timing at which a brake is applied and a brake amount (amount of braking), and controls the apparatuses that compose the brake mechanism 212 such that the determined brake amount is achieved at the determined timing.

The steering ECU 203 controls a steering mechanism 213. The steering mechanism 213 is composed of an apparatus group (actuator) that is related to steering, such as a power steering motor. The steering ECU 203 determines a steering amount (steering angle) based on the measurement values acquired from the yaw rate sensor 57 and the steering angle sensor 58, and controls the apparatuses that compose the steering mechanism 213 such that the determined steering amount is achieved.

The traveling control apparatus 10 includes a target object detecting unit 11, a relative speed detecting unit 12, an acceleration setting unit 13, a traveling control unit 14, an approach identifying unit 20, an intersecting-direction distance detecting unit 21, a boundary line detecting unit 22, a boundary-line overoverlap ratio detecting unit 23, a traveling direction distance detecting unit 24, and a lane change detecting unit 25. Each of these functional units 11 to 25 is implemented by the microcomputer (not shown) of the traveling control apparatus 10 running a control program that is stored in advance in a storage unit (not shown) of the traveling control unit 10.

Figure 2:
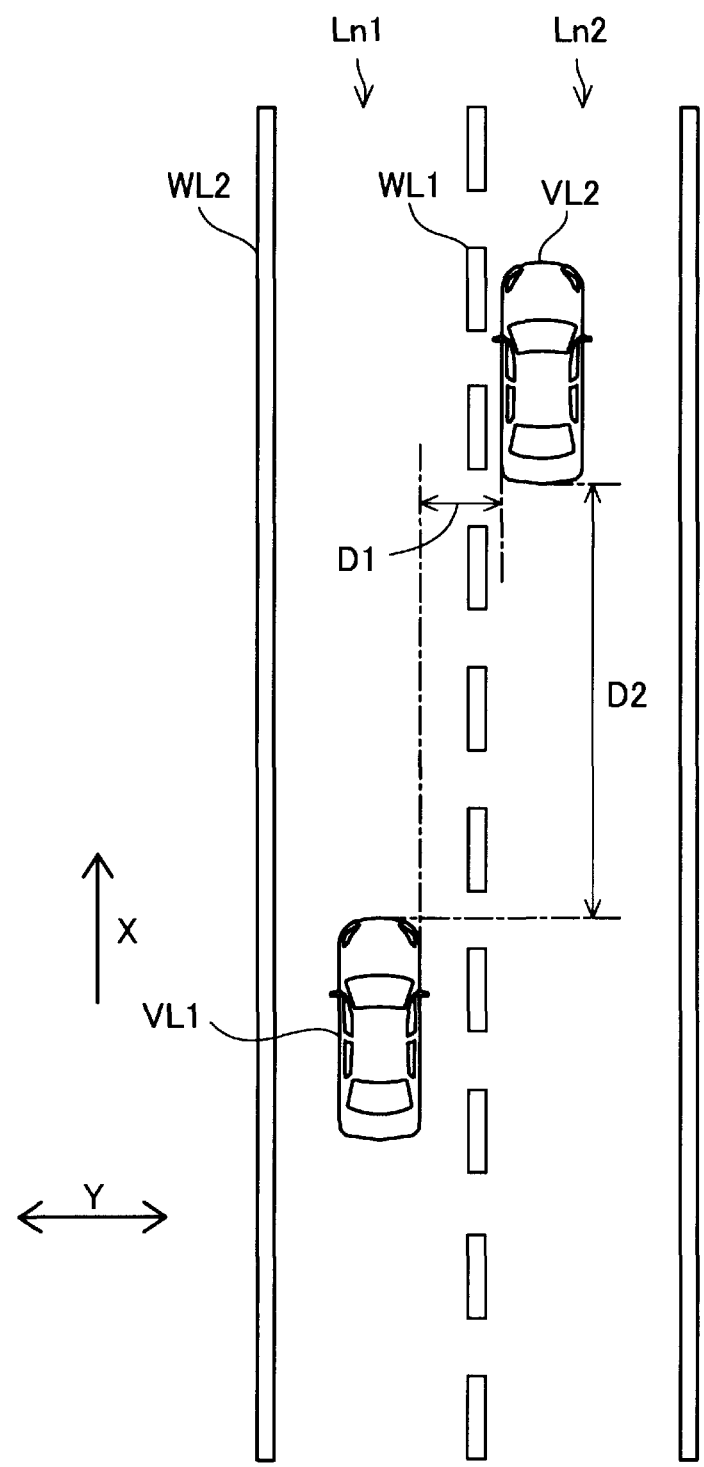
FIG. 2 is an explanatory diagram for explaining an example of an approach between an own vehicle and a target object.

FIG. 2 shows an own vehicle VL1 that is traveling in a travelling direction X in an own traffic lane Ln1 and another vehicle VL2 that is traveling in the travelling direction X in an adjacent traffic lane Ln2 that is adjacent to the own traffic lane Ln1. In addition, FIG. 2 shows a boundary line WL1 that is present between the own traffic lane Ln1 and the adjacent traffic lane Ln2, and a boundary line WL2 that is positioned on an opposite side of the own traffic lane Ln1 from the boundary line WL1. According to the present embodiment, the boundary line WL1 is composed of a white line that is marked on a road surface.

The target object detecting unit 11 shown in FIG. 1 detects a target object that is present ahead in the travelling direction X of the own vehicle VL1 and is not present in the own traffic lane Ln1. Therefore, the target object may be present ahead of and to a right side of the own vehicle VL1 in the travelling direction X or may be present ahead of and to a left side of the own vehicle VL1 in the travelling direction X.

In addition to the other vehicle VL2 shown in FIG. 2, a person, a wall, an obstacle in a construction zone, and the like are applicable as the target object. Detection of the target object may be performed based on at least one piece of information among a captured image acquired by the imaging camera 54, a detection result from the millimeter-wave radar 55 or the LiDAR 56, and a communication result from the wireless communication apparatus 29.

The relative speed detecting unit 12 shown in FIG. 1 detects the relative speed of the target object relative to the own vehicle VL1 along the travelling direction X. The relative speed corresponds to a value that is obtained by the speed of the own vehicle VL1 being subtracted from the speed of the target object. Therefore, the relative speed is indicated by a negative value when the own vehicle VL1 is approaching the target object. The relative speed is indicated by a positive value when the own vehicle VL1 is moving away from the target object.

Consequently, for example, when the speed at which the own vehicle VL1 is approaching the target object becomes faster, an absolute value of the relative speed indicated by the negative value increases and the value of the relative speed becomes more negative. Detection of the relative speed may be performed based on at least one piece of information among a detection result from the millimeter-wave radar 55 or the LiDAR 56, and a communication result from the wireless communication apparatus 59.

The acceleration setting unit 13 sets a target acceleration of the own vehicle VL1 along the travelling direction X by performing an acceleration setting process, described hereafter. More specifically, the acceleration setting unit 13 sets the target acceleration of the own vehicle VL1 when the own vehicle VL1 passes the side of the target object. The target acceleration is indicated by a change in speed per unit time. The target acceleration being a positive value indicates that the speed increases. The target acceleration being zero indicates that the speed does not change. The target acceleration being a negative value indicates that the speed decreases in magnitude.

"Passes the side of the target object" may also include a state that is before a state in which the own vehicle VL1 approaches the target object, and a tip end portion of the own vehicle VL1 in the travelling direction X and a rear end portion of the target object in the travelling direction X overlap in the travelling direction X. A detailed description of the setting of the target acceleration will be described hereafter.

The traveling control unit 14 instructs the operation control apparatus 200 to perform control such that the own vehicle VL1 travels at the target acceleration set by the acceleration setting unit 13 and passes the side of the target object. More specifically, when an approach flag is set to ON in an approach identification process, described hereafter, the own vehicle VL1 is made to travel at the target acceleration that has been set and pass the side of the target object at a relative speed that is within a predetermined range.

After passing is completed, the own vehicle VL1 is made to travel under ordinary control. "Passing is completed" refers to a state in which a rear end portion of the own vehicle VL1 in the travelling direction X is positioned further frontward in the travelling direction X than a tip end portion of the target object in the travelling direction X.

The approach identifying unit 20 identifies whether a current state is a predetermined state in which the approach between the own vehicle VL1 and the target object is presumed (also referred to, hereafter, as an "approach-presumed state") by performing the approach identification process, described hereafter. The approach identifying unit 20 identifies whether a target object that serves as an approaching target object of which the approach with the own vehicle VL1 is presumed is present. When identified that the target object is present, the approach identifying unit 20 identifies that the current state is the approach-presumed state.

An indicator that indicates the approach-presumed state is predetermined and stored in the storage unit of the traveling control apparatus 10. As the indicator that indicates the approach-presumed state, thresholds that are predetermined for detection target objects of the intersecting-direction distance detecting unit 21, the boundary line detecting unit 22, the boundary-line overoverlap ratio detecting unit 23, and the travelling direction distance detecting unit 24, and a lane change intention are applicable.

The intersecting-direction distance calculating unit 21 detects a distance (also referred to, hereafter, as an "intersecting-direction distance D1") between the own vehicle VL1 and the target object along an intersecting direction Y that intersects the travelling direction X. In the example shown in FIG. 2, a distance from a right-side surface portion of the own vehicle VL1 to a left-side surface portion of the target object is indicated as the intersecting-direction distance D1. Here, unlike that in the example in FIG. 2, when the target object is present ahead of and to the left side of the own vehicle VL1, a distance from a left-side surface portion of the own vehicle VL1 to a right-side surface portion of the target object corresponds to the intersecting-direction distance D1.

Detection of the intersecting-direction distance D1 may be performed based on at least one piece of information among a captured image acquired by the imaging camera 54, a detection result from the millimeter-wave radar 55 or the LiDAR 56, and a communication result from the wireless communication apparatus 29. Here, for example, detection of the intersecting-direction distance D1 may be calculated based on a distance from a center of the own vehicle VL1 to a side surface portion of the target object in the intersecting direction Y, and a vehicle width of the own vehicle VL1.

The boundary line detecting unit 22 shown in FIG. 1 detects a boundary line that is present between the own traffic lane Ln1 and the target object. In addition, the boundary line detecting unit 22 detects a boundary line that is present on the opposite side of the own traffic lane Ln1 from the target object. More specifically, the boundary line detecting unit 22 detects a boundary line that is composed of an arbitrary feature, such as a white line and a line of another color that correspond to a boundary in a width direction that demarcates the own traffic lane Ln1, a section that protrudes in a band shape along the traffic lane on the road surface, and a step that composes a sidewalk.

Detection of the boundary line may be performed based on at least one piece of information among a captured image acquired by the imaging camera 54, a detection result from the millimeter-wave radar 55 or the LiDAR 56, and a communication result from the wireless communication apparatus 29. In the example shown in FIG. 2, the boundary line WL1 that is present between the own traffic lane Ln1 and the other vehicle VL2 is detected.

The boundary-line overlap ratio detecting unit 23 shown in FIG. 1 detects a boundary-line overlap ratio (lap ratio) of the target object relative to the boundary line that is present between the own traffic lane Ln1 and the target object. The boundary-line overlap ratio indicates a degree of an overlapping portion between the target object and the boundary line. The boundary-line overlap ratio serves as an indicator that indicates how close the target object is positioned to the boundary line.

According to the present embodiment, for example, a state in which the left-side surface portion of the other vehicle VL2 and the right end portion of the boundary line WL1 coincide, unlike that in the example shown in FIG. 2, is defined as a boundary-line overlap ratio of 0%.

A state in which the other vehicle VL2 has completely run outside of the boundary line WL1 and is positioned inside the own traffic lane Ln1, and the right-side surface portion of the other vehicle VL2 and the left end portion of the boundary line WL1 coincide is defined as a boundary-line overlap ratio of 100%.

Therefore, for example, when the center of the other vehicle VL2 in the width direction is positioned at the center of the boundary line WL1 in the width direction, the boundary-line overlap ratio is 50%. When the left-side surface portion of the other vehicle VL2 is positioned further towards the right side than the right end portion of the boundary line WL1 as shown in FIG. 2, the boundary-line overlap ratio is a negative value.

Consequently, the value of the boundary-line overlap ratio decreasing means that the target object is moving away from the own traffic lane Ln1 side and the distance between the target object and the boundary line along the intersecting direction Y is increasing. Detection of the boundary-line overlap ratio may be performed based on at least one piece of information among a captured image acquired by the imaging camera 54, a detection result from the millimeter-wave radar 55 or the LiDAR 56, and a communication result from the wireless communication apparatus 29.

The travelling direction distance detecting unit 24 shown in FIG. 1 detects a distance (also referred to, hereafter, as an "travelling direction distance D2") between the own vehicle VL1 and the target object along the travelling direction X. According to the present embodiment, a distance from the tip end portion of the own vehicle VL1 to the rear end portion of the target object in the travelling direction X is defined as the travelling direction distance D2.

In the example shown in FIG. 2, an inter-vehicle distance between the own vehicle VL1 and the other vehicle VL2 corresponds to the travelling direction distance D2. Detection of the travelling direction distance D2 may be performed based on at least one piece of information among a captured image acquired by the imaging camera 54, a detection result from the millimeter-wave radar 55 or the LiDAR 56, and a communication result from the wireless communication apparatus 29.

Figure 3:
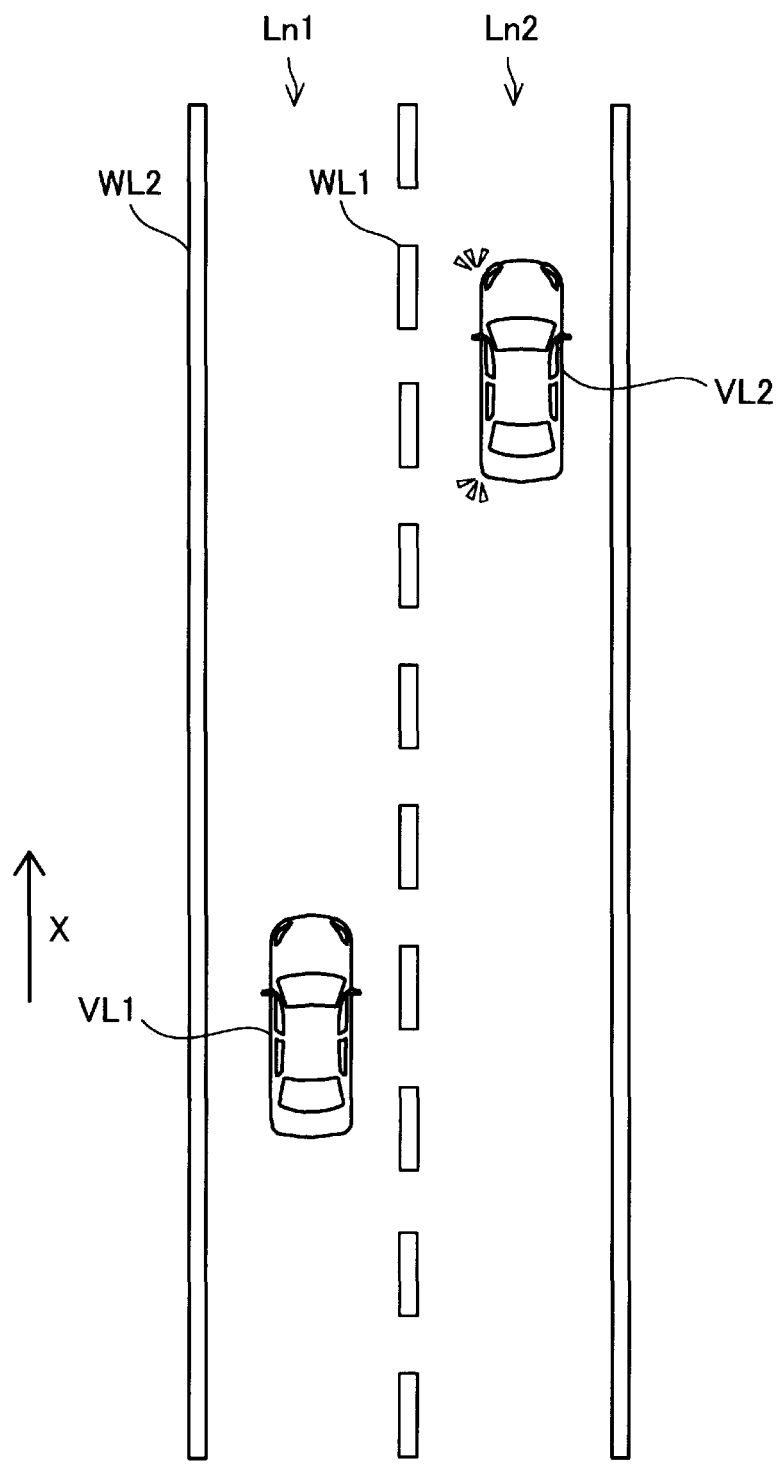
FIG. 3 is an explanatory diagram for explaining a lane change intention.

The lane change detecting unit 25 shown in FIG. 1 detects that the other vehicle VL2 that serves as the target object intends to change traffic lanes to the own traffic lane Ln1. As shown in FIG. 3, detection of the other vehicle VL2 intending to change traffic lanes to the own traffic lane Ln1 may be performed as a result of a turn signal of the other vehicle VL2 changing from an off state to an illuminated state, based on captured images acquired by the imaging camera 54 or the like, or may be performed based on a communication result from the wireless communication apparatus 59.

The traveling control apparatus 10 that is configured as described above performs the approach identification process and the acceleration setting process, described hereafter. As a result, when a target object that is present ahead in the travelling direction of the own vehicle VL1 and is not present in the own traffic lane Ln1 is present, the traveling control apparatus 10 enables the own vehicle VL1 to pass the side of the target object at a relative speed that is within a predetermined range and suppresses unease experienced by a passenger.

According to the present embodiment, the other vehicle VL2 corresponds to a more specific example of a target object in the means for solving the problem. The boundary-line overlap ratio detecting unit 23 corresponds to a more specific concept of a boundary-line distance detecting unit in the means for solving the problem.

A-2. Approach Identification Process

Figure 4:
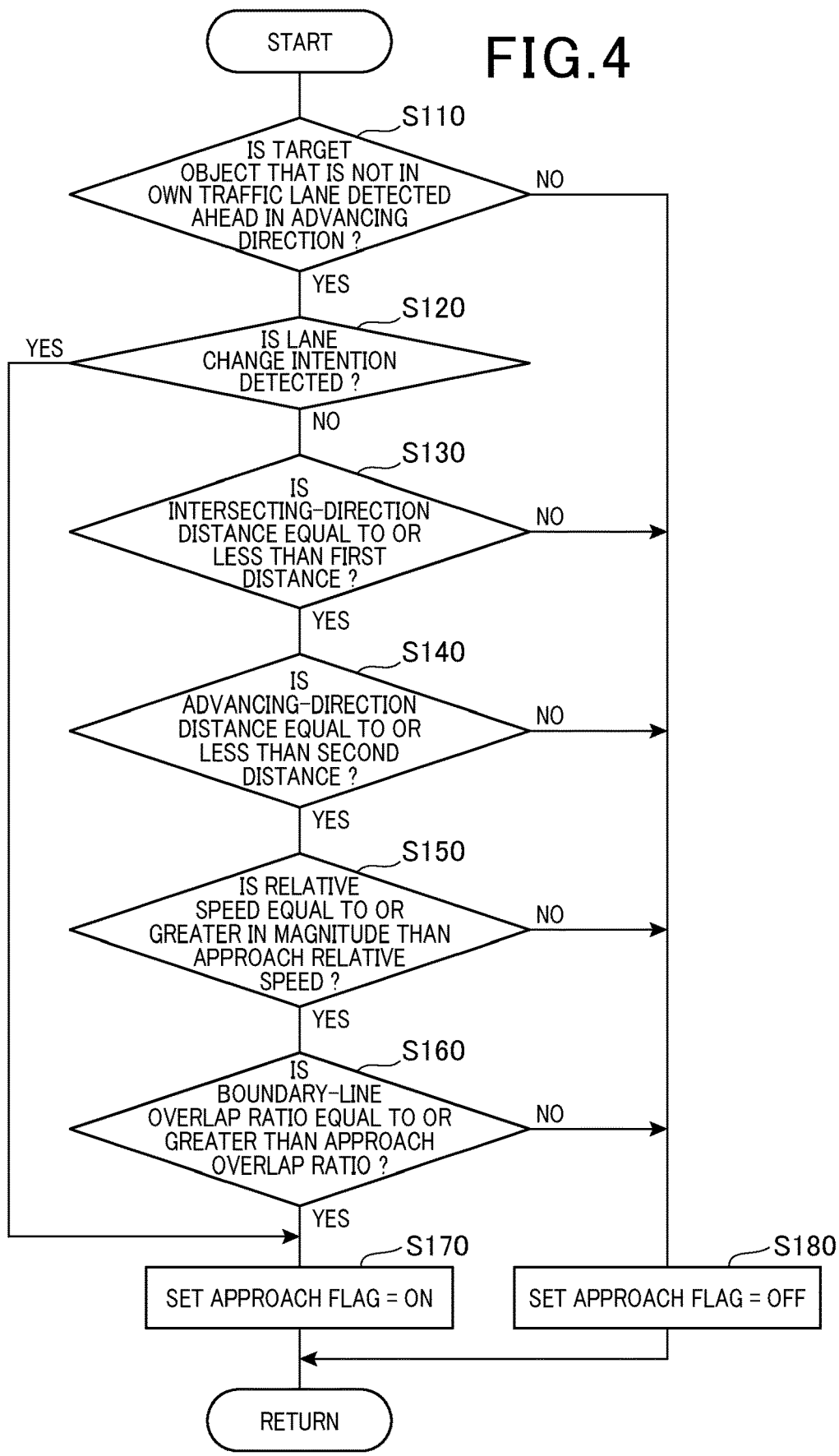
FIG. 4 is a flowchart of the steps in an approach identification process.

The approach identification process shown in FIG. 4 is a process for identifying the approach-presumed state of the own vehicle VL1 and the target object. The approach identification process is performed by the traveling control apparatus 10 when an ignition of the own vehicle VL1 is turned on. The approach identifying unit 20 identifies whether a target object that is not in the own traffic lane Ln1 ahead of the own vehicle VL1 in the travelling direction X is detected by the target object detecting unit 11 (step S110).

When identified that a target object is not detected (NO at S110), the approach identifying unit 20 identifies that the current state is not the approach-presumed state in which the approach between the own vehicle VL1 and the target object is presumed and turns OFF the approach flag (step S180). After performing step S180, the approach identifying unit 20 returns to S110.

Meanwhile, when identified that a target object is detected (YES at S110), the approach identifying unit 20 identifies whether a lane change intention of the target object to the own traffic lane Ln1 is detected by the lane change detecting unit 25 (step S120). The target object in this case means the other vehicle VL2. The lane change intention corresponds to one of the indicators that indicate the approach-presumed state. A reason for this is that, when the other vehicle VL2 that is the target object intends to change traffic lanes to the own traffic lane Ln1, the other vehicle VL2 is expected to perform an operation in which a vehicle body is moved closer to the own traffic lane Ln1 side, to change traffic lanes.

When identified that the lane change intention of the target object is detected (YES at step S120), the approach identifying unit 20 identifies that the current state is the approach-presumed state in which the approach between the own vehicle VL1 and the target object is presumed and turns ON the approach flag (step S170). After performing step S170, the approach identifying unit returns to S110.

At step S120, when identified that the lane change intention of the target object is not detected (NO at step S120), the approach identifying unit 20 determines whether the intersecting-direction distance D1 is equal to or less than a first distance based on the detection result of the intersecting-direction distance detecting unit 21 (step S130).

The first distance is set in advance as one of the indicators that indicate the approach-presumed state and stored in the storage unit of the traveling control apparatus 10. According to the present embodiment, the first distance is set to 1.2 m. Here, instead of 1.2 m, the first distance may be set to an arbitrary distance that indicates the approach-presumed state, such as 1 m or 1.2 m.

When determined that the intersecting-direction distance D1 is not equal to or less than the first distance (NO at step S130), that is, when determined that the intersecting-direction distance D1 exceeds the first distance, the approach identifying unit 20 identifies that the current state is not the approach-presumed state and turns OFF the approach flag (step S180).

Meanwhile, when determined that the intersecting-direction distance D1 is equal to or less than the first distance (YES at step S130), the approach identifying unit 20 determines whether the travelling direction distance D2 is equal to or less than a second distance based on the detection result of the travelling direction distance detecting unit 24 (step S140).

The second distance is set in advance as one of the indicators that indicate the approach-presumed state and is stored in the storage unit of the traveling control apparatus 10. According to the present embodiment, the second distance is set to 50 m. Here, instead of 50 m, the second distance may be set to an arbitrary distance that indicates the approach-presumed state, such as 30 m or 100 m.

When determined that the travelling direction distance D2 is not equal to or less than the second distance (NO at step S140), that is, when determined that the travelling direction distance D2 exceeds the second distance, the approach identifying unit 20 identifies that the current state is not the approach-presumed state and turns OFF the approach flag (step S180).

Meanwhile, when determined that the travelling direction distance D2 is equal to or less than the second distance (YES at step S140), the approach identifying unit 20 determines whether the relative speed of the target object relative to the own vehicle VL1 is equal to or greater in magnitude than an approach relative speed based on the detection result of the relative speed detecting unit 12 (step S150).

The approach relative speed is set in advance as one of the indicators that indicate the approach-presumed state and stored in the storage unit of the traveling control apparatus 10. The relative speed is indicated by a negative value and indicates that the own vehicle VL1 is in a state of approaching the target object. According to the present embodiment, the approach relative speed is set to a relative speed of −10 km/h. Here, instead of the relative speed of −10 km/h, the approach relative speed may be set to an arbitrary relative speed that indicates the approach-presumed state, such as a relative speed of −5 km or −20 km/h.

When determined that the relative speed of the target object relative to the own vehicle VL1 is not equal to or greater in magnitude than the approach relative speed (NO at step S150), that is, when determined that the relative speed of the target object relative to the own vehicle VL1 is less in magnitude than the approach relative speed, the approach identifying unit 20 identifies that the current state is not the approach-presumed state and turns OFF the approach flag (step S180).

In this case, for example, a state in which the relative speed of the target object relative to the own vehicle VL1 is 0 and the own vehicle VL1 and the target object are traveling at a same speed, or a state in which the relative speed of the target object relative to the own vehicle VL1 is a positive value and the own vehicle VL1 and the target object are moving away from each other are applicable.

Meanwhile, when determined that the relative speed of the target object relative to the own vehicle VL1 is equal to or greater in magnitude than the approach relative speed (YES at step S150), the approach identifying unit 20 determines whether the boundary-line overlap ratio is equal to or greater than an approach overlap ratio (step S160). The approach overlap ratio is set in advance as one of the indicators that indicate the approach-presumed state and stored in the storage unit of the traveling control apparatus 10. According to the present embodiment, the approach overlap ratio is set to −10%. Here, instead of −10%, the approach overlap ratio may be set to an arbitrary value that indicates the approach-presumed state, such as 0% or −30%.

When determined that the boundary-line overlap ratio is not equal to or greater than the approach overlap ratio (NO at step S160), that is, when determined that the boundary-line overlap ratio is less than the approach overlap ratio, the approach identifying unit 20 identifies that the current state is not the approach-presumed state and turns OFF the approach flag (step S180). A reason for this is that, when the boundary-line overlap ratio is less than the approach overlap ratio, the target object is expected to be sufficiently far from the own traffic lane Ln1 side, and the distance between the target object and the boundary line WL1 in the intersecting direction Y is expected to be sufficiently great.

Meanwhile, when determined that the boundary-line overlap ratio is equal to or greater than the approach overlap ratio (YES at step S160), the approach identifying unit 20 identifies that the current state is the approach-presumed state and turns ON the approach flag (step S170).

A-3. Acceleration Setting Process

Figure 5:
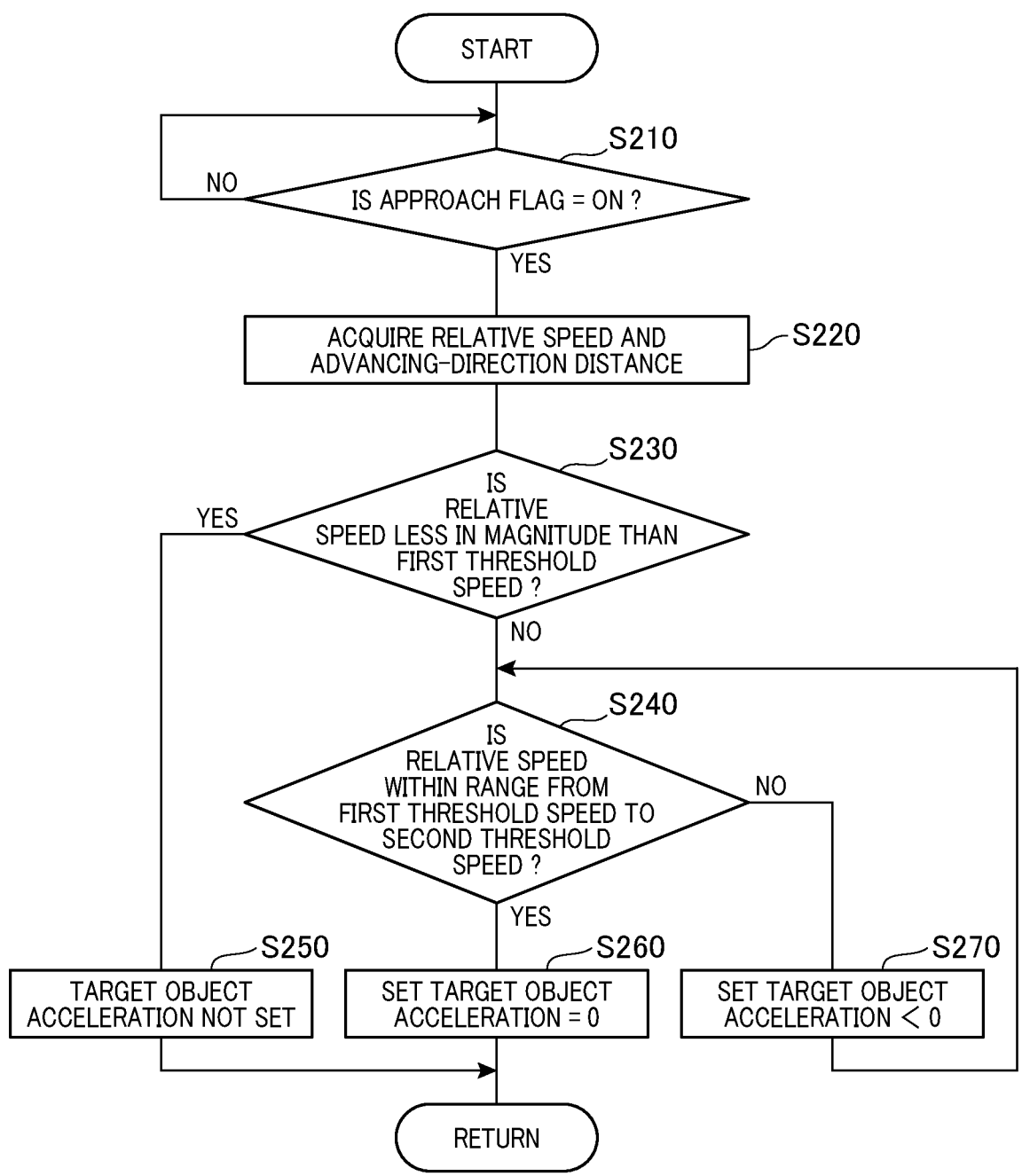
FIG. 5 is a flowchart of the steps in an acceleration setting process.

The acceleration setting process shown in FIG. 5 is a process for setting the target acceleration of the own vehicle VL1 along the travelling direction X when the own vehicle VL1 passes the side of a target object. The acceleration setting process is performed in parallel with the approach identification process in the traveling control apparatus 10 when the ignition of the own vehicle VL1 is turned on.

The acceleration setting unit 13 determines whether the approach flag is set to ON as a result of the approach identification process (step S210). When determined that the approach flag is not set to ON (NO at step S210), that is, when determined that the approach flag is set to OFF, the acceleration setting unit repeats step S210.

When determined that the approach flag is set to ON (YES at S210), the acceleration setting unit 13 acquires the current relative speed and travelling direction distance D1 of the target object relative to the own vehicle VL1 based on the detection result of the relative speed detecting unit 12 (step S220). The relative speed in this case is indicated by a negative value because the determination at step S150 in the approach identification process shown in FIG. 4 is YES.

The acceleration setting unit 13 determines whether the relative speed acquired at step S220 is less in magnitude than a first threshold speed (step S230). The first threshold speed is a speed along the travelling direction X that is indicated by a negative value. The first threshold speed is set in advance as a relative speed at which the own vehicle VL1 is able to sufficiently slowly approach and pass the side of the target object, and stored in the storage unit of the traveling control apparatus 10.

That is, the first threshold speed is a relative speed at which a passenger does not experience unease when the own vehicle VL1 passes the side of the target object at the first threshold speed. The first threshold speed is predetermined as a relative speed that is a negative value at which the own vehicle VL1 is able to pass the side of the target object.

When determined that the relative speed is less in magnitude than the first threshold speed (YES at step S230), the acceleration setting unit 13 returns to step S210 without setting the target acceleration when the own vehicle VL1 passes the side of the target object (step S250). The relative speed being less in magnitude than the first threshold speed means a state in which the own vehicle VL1 is approaching the target object even more slowly than the relative speed at which the passenger does not experience uneasiness.

Therefore, even if the own vehicle VL1 continues traveling at the current relative speed, the passenger is not expected to experience unease when the own vehicle VL1 passes the side of the target object. The target acceleration not being set means that ordinary control based on a current preset speed that is set in the own vehicle VL1, a tracking speed, or the like is performed. In this case, the traveling control unit 14 enables the own vehicle VL1 to travel at a speed that is set in ordinary control and to pass the side of the target object. The own vehicle VL1 similarly travels at the speed that is set in ordinary control or the like, even after passing the side of the target object is completed.

Meanwhile, when determined that the relative speed is not less in magnitude than the first threshold speed (NO at step S230), that is, when determined that the relative speed is equal to or greater in magnitude than the first threshold speed, the acceleration setting unit 13 determines whether the relative speed is within a range from the first threshold speed to a second threshold speed (step S240).

The second threshold speed is a speed along the travelling direction X that is indicated by a negative value. In addition, the second threshold speed is a speed of which the value is greater in magnitude than that of the first threshold speed and stored in the storage unit of the traveling control apparatus 10. The second threshold speed is predetermined based on experiments as a minimum relative speed in magnitude among relative speeds that are such that a passenger experiences uneasiness when the own vehicle VL1 passes the side of the target object.

When determined that the relative speed is within the range from the first threshold speed to the second threshold speed (YES at step S240), the acceleration setting unit 13 sets the target acceleration to 0 (step S260) and returns to step S210. The target acceleration being set to zero means that constant speed control in which the speed is not changed from the current speed is performed.

In this case, the traveling control unit 14 enables the own vehicle VL1 to continue traveling at the current speed, with the target acceleration at zero, and to pass the side of the target object. The own vehicle VL1 travels at the speed that is set in ordinary control or the like, after passing the side of the target object is completed.

At step S240, when determined that the relative speed is not within the range from the first threshold speed to the second threshold speed (NO at step S240), that is, when determined that the relative speed is greater in magnitude than the second threshold speed, the acceleration setting unit 13 sets the target acceleration to less than zero (step S270).

The target acceleration being set to less than zero means that deceleration control in which the speed is made slower than the current speed is performed. Therefore, the relative speed that is indicated by the negative value reduces in magnitude and the own vehicle VL1 more slowly approaches the target object. After step S270, the acceleration setting unit 13 returns to step S240.

Therefore, the acceleration setting unit 13 sets the target acceleration to less than zero until the relative speed becomes equal to the second threshold speed or less in magnitude than the second threshold speed. In this case, the traveling control unit 14 decelerates the own vehicle VL1 by deceleration control, and enables the own vehicle VL1 to travel at the second threshold speed and to pass the side of the target object. The own vehicle VL1 travels at the speed that is set in ordinary control or the like, after passing the side of the target object is completed.

According to the present embodiment, the target acceleration is set such that the relative speed becomes the second threshold speed at a point at which the own vehicle VL1 approaches the target object and the travelling direction distance D2 becomes a passing start distance. The passing start distance is set in advance as a distance between the own vehicle VL1 and the target object along the travelling direction X at which a passenger recognizes the start of passing, and stored in the storage unit of the traveling control apparatus 10.

The passing start distance corresponds to the travelling direction distance D2 in a state that is before a state in which the tip end portion of the own vehicle VL1 in the travelling direction X and the rear end portion of the target object in the travelling direction X overlap in the travelling direction X. According to the present embodiment, the passing start distance is set to about 50 m. Here, instead of 50 m, the passing start distance may be set to an arbitrary travelling direction distance D2 at which a passenger recognizes the start of passing, such as 30 m or 80 m.

In examples shown in FIG. 6 to FIG. 10, each upper graph indicates the speed of the own vehicle VL1. Each middle graph indicates the relative speed of the target object relative to the own vehicle VL1. Each lower graph indicates the result of the approach identification process. A horizontal axis of each graph indicates time. A thick solid line indicates a preset speed of the own vehicle VL1 that is set in ordinary control. A single-dot chain line indicates an actual speed of the own vehicle VL1. A double-dot chain line indicates the relative speed of the target object relative to the own vehicle VL1.

A region in which the relative speed is less in magnitude than the first threshold speed indicates an ordinary control region in which the determination at step S230 in the acceleration setting process shown in FIG. 5 is YES and S250 is performed. A region in which the relative speed is from the first threshold speed to the second threshold speed indicates a constant speed control region in which the determination at step S240 in the acceleration setting process is YES and step S260 is performed. A region in which the relative speed is greater in magnitude than the second threshold speed indicates a deceleration control region in which the determination at step S240 in the acceleration setting process is NO and step S270 is performed.

Figure 6:
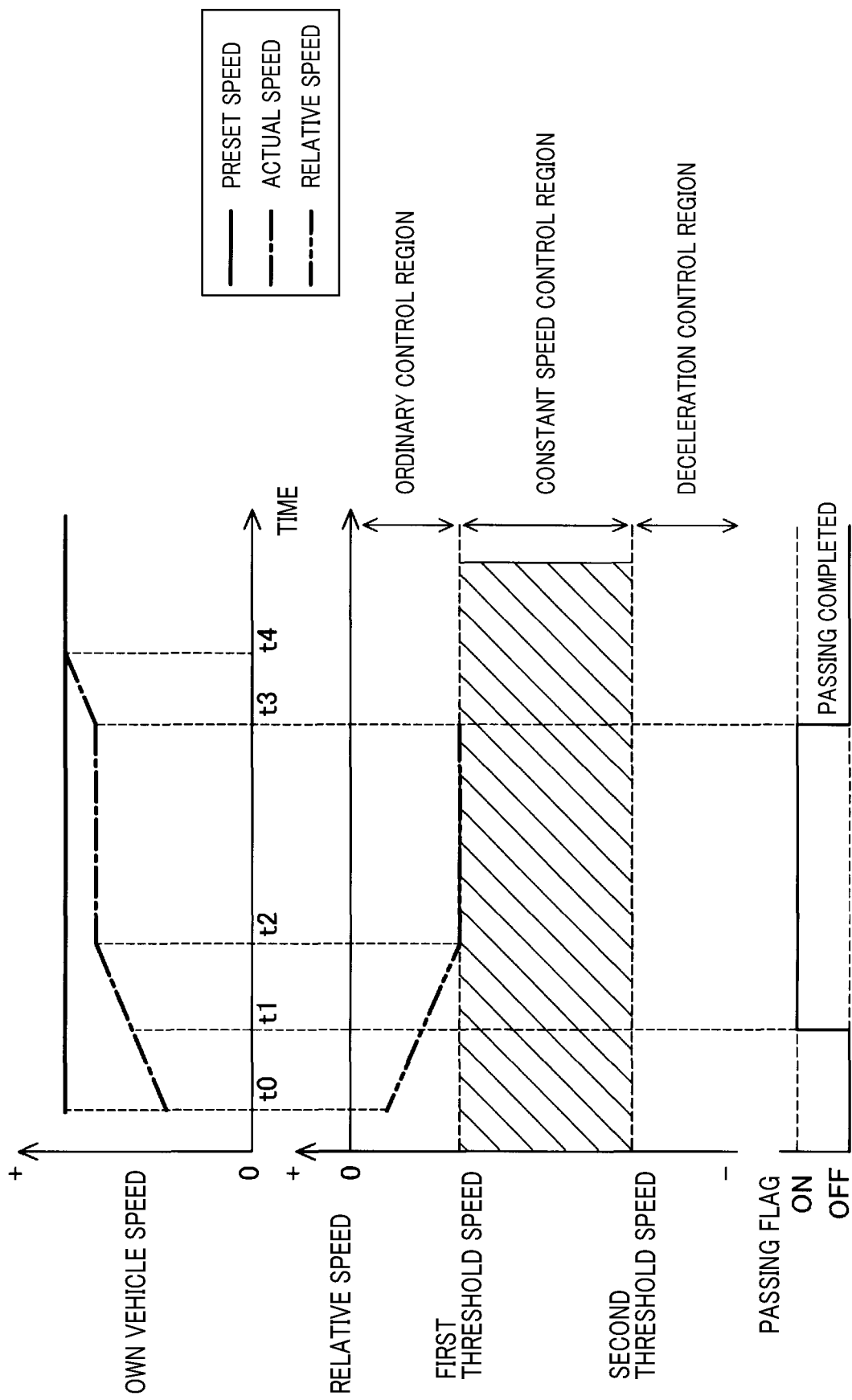
FIG. 6 is an explanatory diagram for explaining content of control based on a result of the acceleration setting process.

In FIG. 6, at time t0, the preset speed is set to a value that is greater than the actual speed as ordinary control. Therefore, to increase the actual speed to the preset speed, the acceleration is set to a positive value. When the own vehicle VL1 travels based on the acceleration that is set to a positive value, the actual speed that is indicated by the single-dot chain line increases and the relative speed that is indicated by the double-dot chain line increases in magnitude.

At time t1, a passing flag in the approach identification process is set to ON. The ON of the passing flag is continued until passing the side of the target object is completed at time t3. At time t1, the relative speed is less in magnitude than the first threshold speed. In this case, because the determination at step S230 in the acceleration setting process shown in FIG. 5 is YES, the own vehicle VL1 remains in the state in which the acceleration is a positive value by ordinary control.

At time t2, the relative speed is equal to the first threshold speed. In this case, because the determination at step S230 in the acceleration setting process shown in FIG. 5 is NO and the determination at step S240 is YES, the target acceleration is set to 0 by the acceleration setting unit 13. Therefore, the own vehicle VL1 approaches the target object while traveling in the state in which the relative speed is maintained at the first threshold speed by constant speed control, and travels past the side of the target object.

At time t3, when passing the side of the target object is completed and the passing flag is set to OFF, the acceleration of the own vehicle VL1 is returned to the value before the target acceleration is set, that is, to the positive value by ordinary control. As a result, the own vehicle VL1 accelerates until the preset speed is reached.

At time t4 when the preset speed is reached and subsequent thereto, the own vehicle VL1 travels at a constant speed. Although not shown for convenience in the example shown in FIG. 6 to FIG. 10, the relative speed becomes a positive value at time t3 at which passing the side of the target object is completed and gradually increases from time t3 and subsequent thereto.

Figure 7:
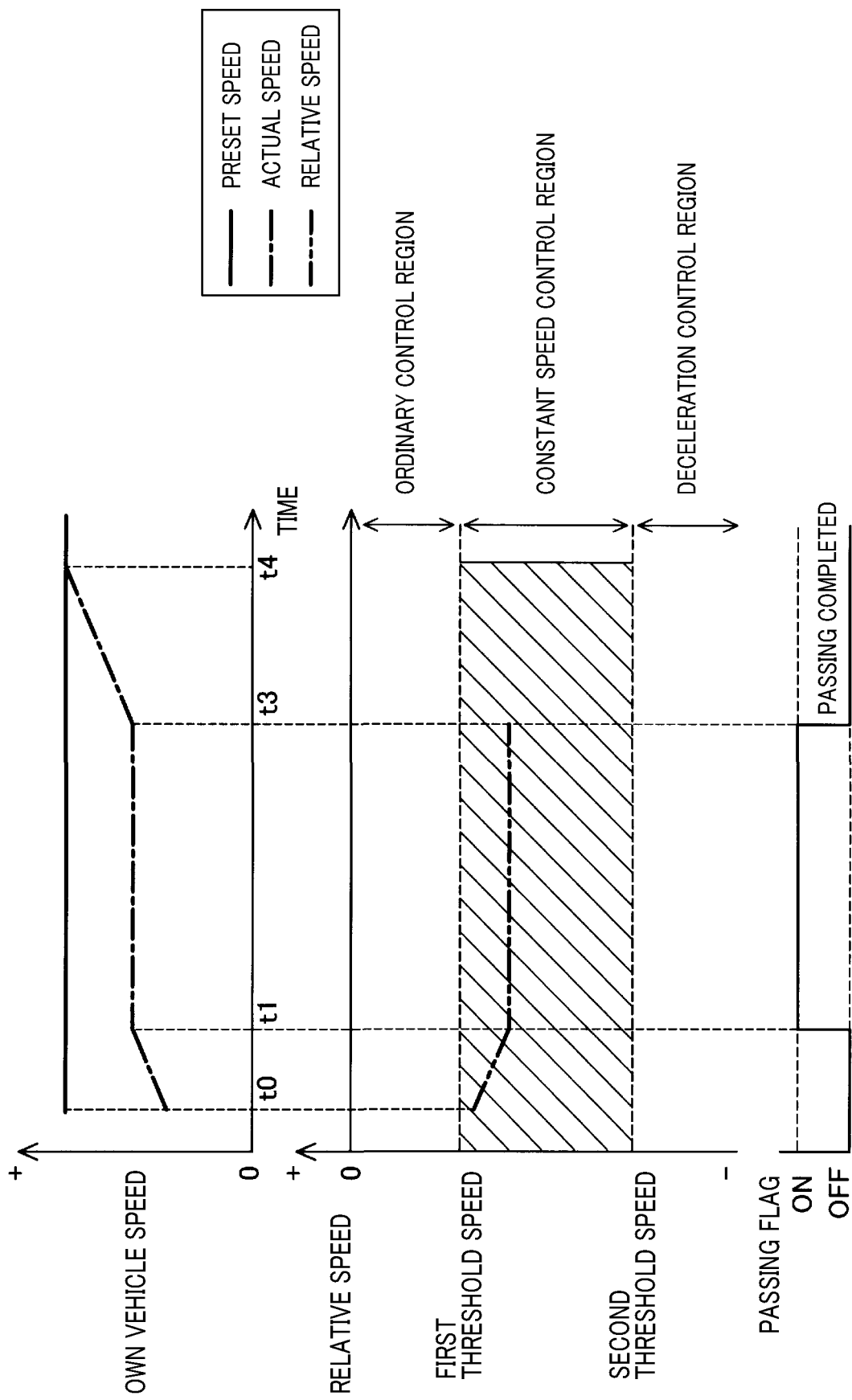
FIG. 7 is an explanatory diagram for explaining the content of control based on the result of the acceleration setting process.

In the example shown in FIG. 7 as well, in a manner similar to that in FIG. 6, at time t0, the preset speed is set to a value that is greater than the actual value, as ordinary control. Therefore, the acceleration is set to a positive value.

At time t1, the passing flag is set to ON. In addition, at time t1, the relative speed is within the range from the first threshold speed to the second threshold speed. In this case, because the determination at step S240 in the acceleration setting process shown in FIG. 5 is YES, the target acceleration is set to 0 by the acceleration setting unit 13. Therefore, the own vehicle VL1 approaches the target object while traveling under constant speed control, and travels past the side of the target object.

At time t3, when passing the side of the target object is completed, the acceleration is returned to the positive value by ordinary control. As a result, the own vehicle VL1 accelerates until the preset speed is reached. At time t4 when the preset speed is reached and subsequent thereto, the own vehicle VL1 travels at a constant speed.

Figure 8:
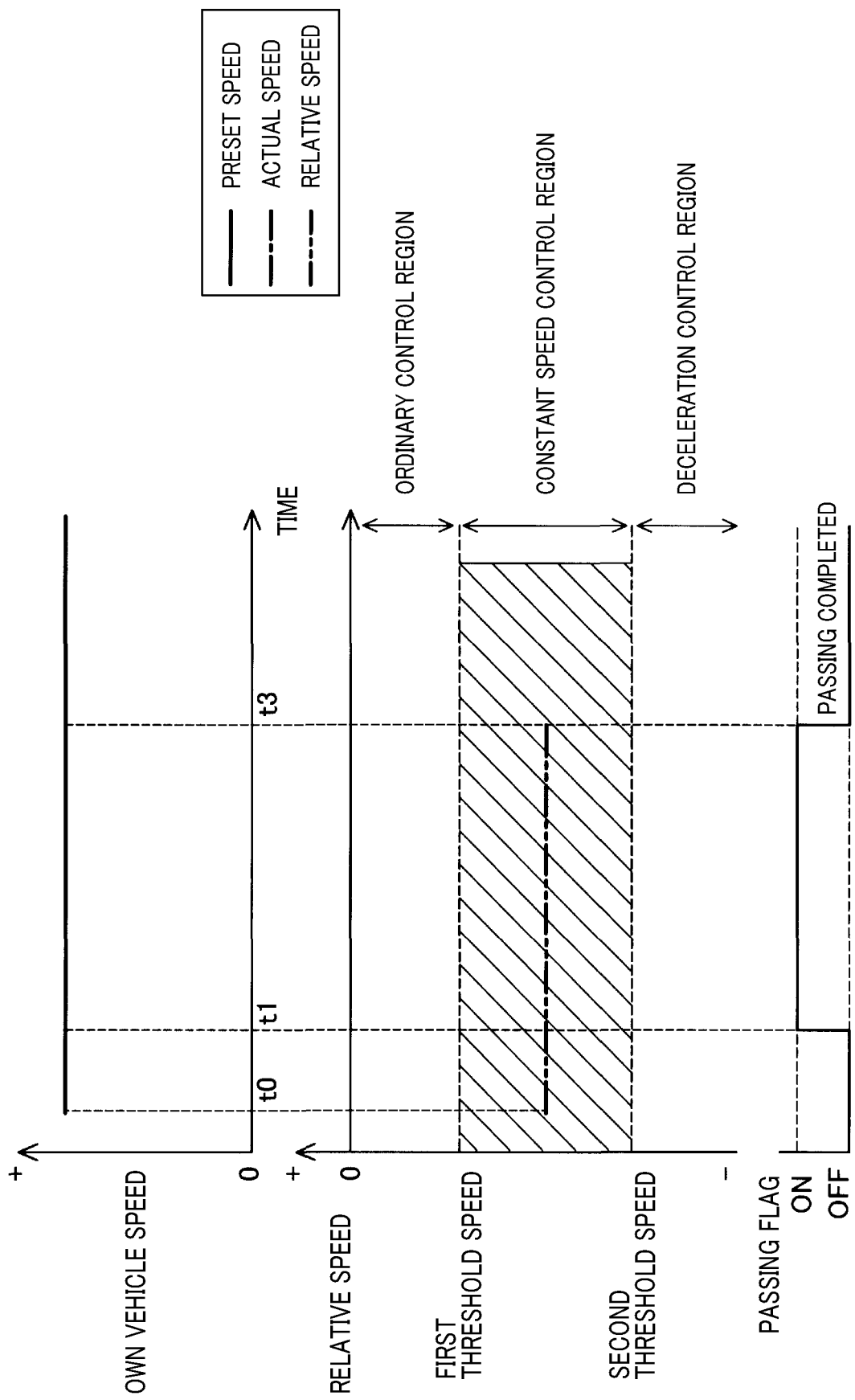
FIG. 8 is an explanatory diagram for explaining the content of control based on the result of the acceleration setting process.

In the example shown in FIG. 8, at time t0, the actual speed coincides with the preset speed as ordinary control. Therefore, the acceleration is set to 0 and traveling is performed at a constant speed.

At time t1, the passing flag is set to ON. In addition, at time t1, the relative speed is within the range from the first threshold speed to the second threshold speed. In this case, because the determination at step S240 in the acceleration setting process shown in FIG. 5 is YES, the target acceleration is set to 0 by the acceleration setting unit 13. Therefore, the own vehicle VL1 approaches the target object while traveling under constant speed control, and travels past the side of the target object.

When passing the side of the target object is completed at time t3, the acceleration remains set to 0 by ordinary control. As a result, the own vehicle VL1 travels at a constant speed at the preset speed.

Figure 9:
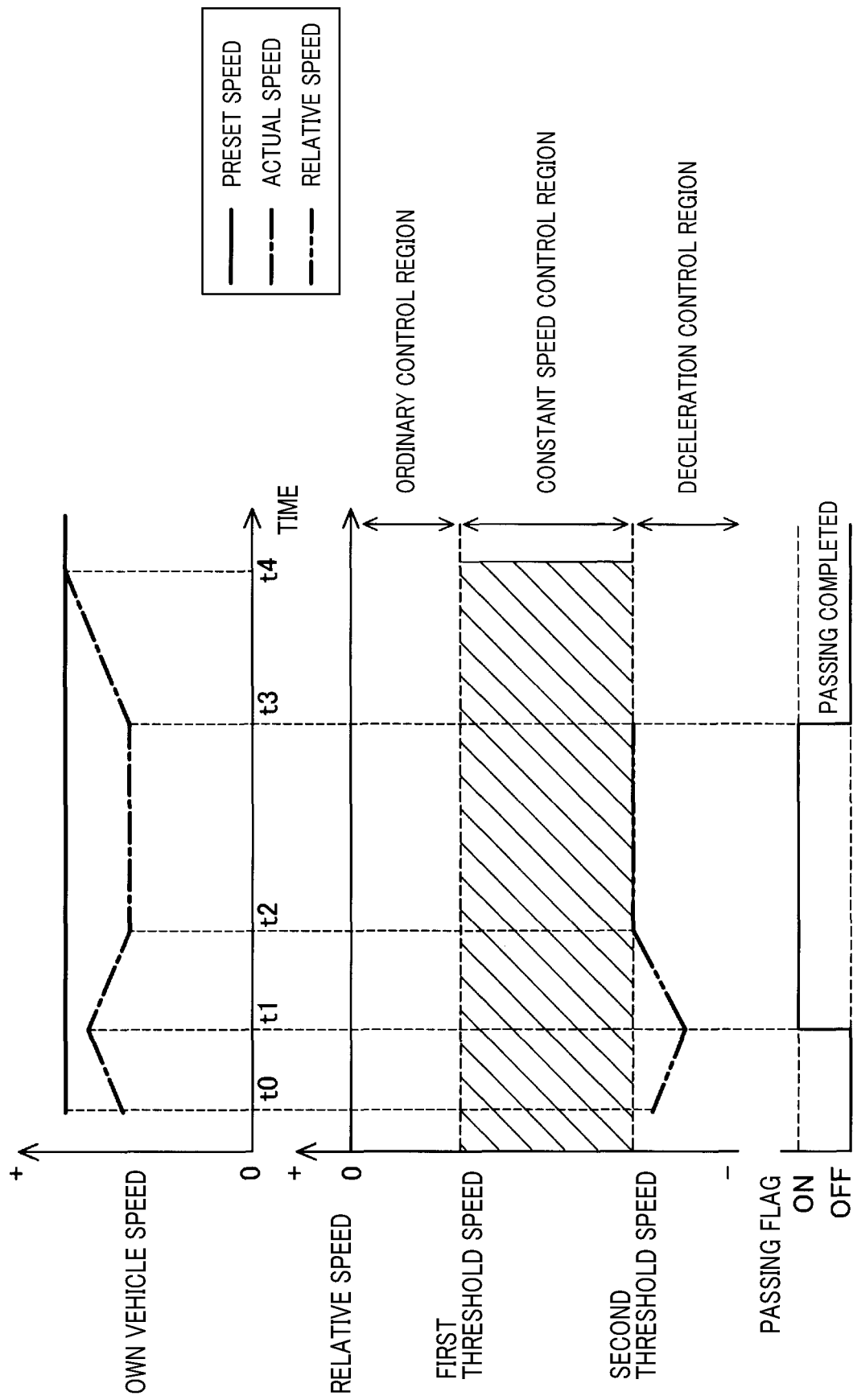
FIG. 9 is an explanatory diagram for explaining the content of control based on the result of the acceleration setting process.

In the example shown in FIG. 9, in a manner similar to that in FIG. 6 and FIG. 7, at time t0, the preset speed is set to a value that is greater than the actual speed, as the ordinary control. Therefore, the acceleration is set to a positive value.

At time t1, the passing flag in the approach identification process is set to ON. In addition, at time t1, the relative speed is greater in magnitude than the second threshold speed. In this case, because the determination at step S240 in the acceleration setting process shown in FIG. 5 is NO, the target acceleration is set to less than 0 by the acceleration setting unit 13. Therefore, the own vehicle VL1 is decelerated by deceleration control.

When the own vehicle VL1 travels at the target acceleration that is set to less than 0, that is, a negative value, the actual speed that is indicated by the single-dot chain line decreases and the relative speed that is a negative value and indicated by the double-dot chain line decreases in magnitude.

At time t2, the relative speed is equal to the second threshold speed. Here, the travelling direction distance D2 between the own vehicle VL1 and the target object at time t2 is the passing start distance. In this case, because the determination at step S240 in the acceleration setting process shown in FIG. 5 is YES, the target acceleration is set to 0 by the acceleration setting unit 13. Therefore, the own vehicle VL1 approaches the target object while traveling in a state in which the relative speed is maintained at the second threshold speed by constant speed control, and travels past the side of the target object.

At time t3, when passing the side of the target object is completed, the acceleration is returned to the positive value by ordinary control. As a result, the own vehicle VL1 accelerates until the preset speed is reached. At time t4 when the preset speed is reached and subsequent thereto, the own vehicle VL1 travels at a constant speed.

Figure 10:
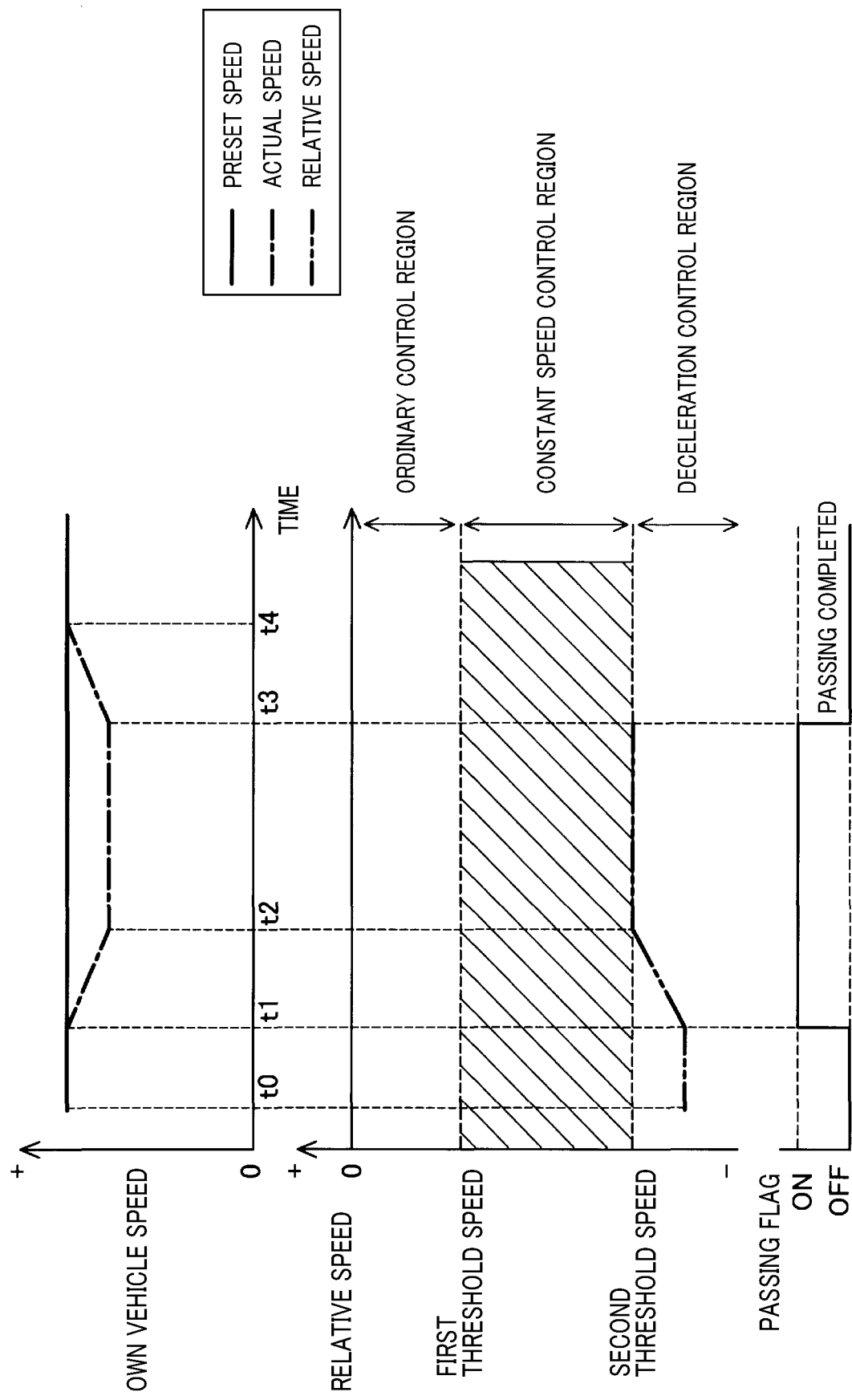
FIG. 10 is an explanatory diagram for explaining the content of control based on the result of the acceleration setting process.

In the example shown in FIG. 10, in a manner similar to that in FIG. 8, at time t0, the actual speed coincides with the preset speed, as ordinary control. Therefore, the acceleration of the own vehicle VL1 is set to 0 and the own vehicle VL1 travels at a constant speed. At time t1, the passing flag is set to ON. In addition, at time t1, the relative speed is greater in magnitude than the second threshold speed. In this case, because the determination at step S240 in the acceleration setting process shown in FIG. 5 is NO, the target acceleration is set to less than 0 by the acceleration setting unit 13. Therefore, the own vehicle VL1 is decelerated by deceleration control.

At time t2, the relative speed is equal to the second threshold speed. Here, the travelling direction distance D2 between the own vehicle VL1 and the target object at time t2 is the passing start distance. In this case, because the determination at step S240 in the acceleration setting process shown in FIG. 5 is YES, the target acceleration is set to 0 by the acceleration setting unit 13. Therefore, the own vehicle VL1 approaches the target object while traveling in a state in which the relative speed is maintained at the second threshold speed, and travels past the side of the target object.

At time t3, when passing the side of the target object is completed, the acceleration is set such that the own vehicle VL1 travels at the preset speed by ordinary control. The actual speed of the own vehicle VL1 is less than the preset speed during a period from time t1 to time t3. Therefore, the acceleration of the own vehicle VL1 is set to a positive value at time t3. As a result, the own vehicle VL1 accelerates until the preset speed is reached. At time t4 when the preset speed is reached and subsequent thereto, the own vehicle VL1 travels at a constant speed.

FIG. 11 to FIG. 14 each show aspects of own vehicles VL1 and VL10 passing the side of a target object based on a time series. In each of FIG. 11 to FIG. 14, the own vehicle VL1 that travels at the target acceleration that is set in the acceleration setting process according to the present embodiment is indicated by a solid line. In each of FIG. 11 to FIG. 14, the own vehicle VL10 that continues to travel under ordinary control as a comparison example is indicated by a broken line. In FIG. 11 to FIG. 14, the preset speeds of the own vehicles VL1 and VL10 in ordinary control are great and the relative speeds are greater in magnitude than the second threshold speed.

Figure 11:
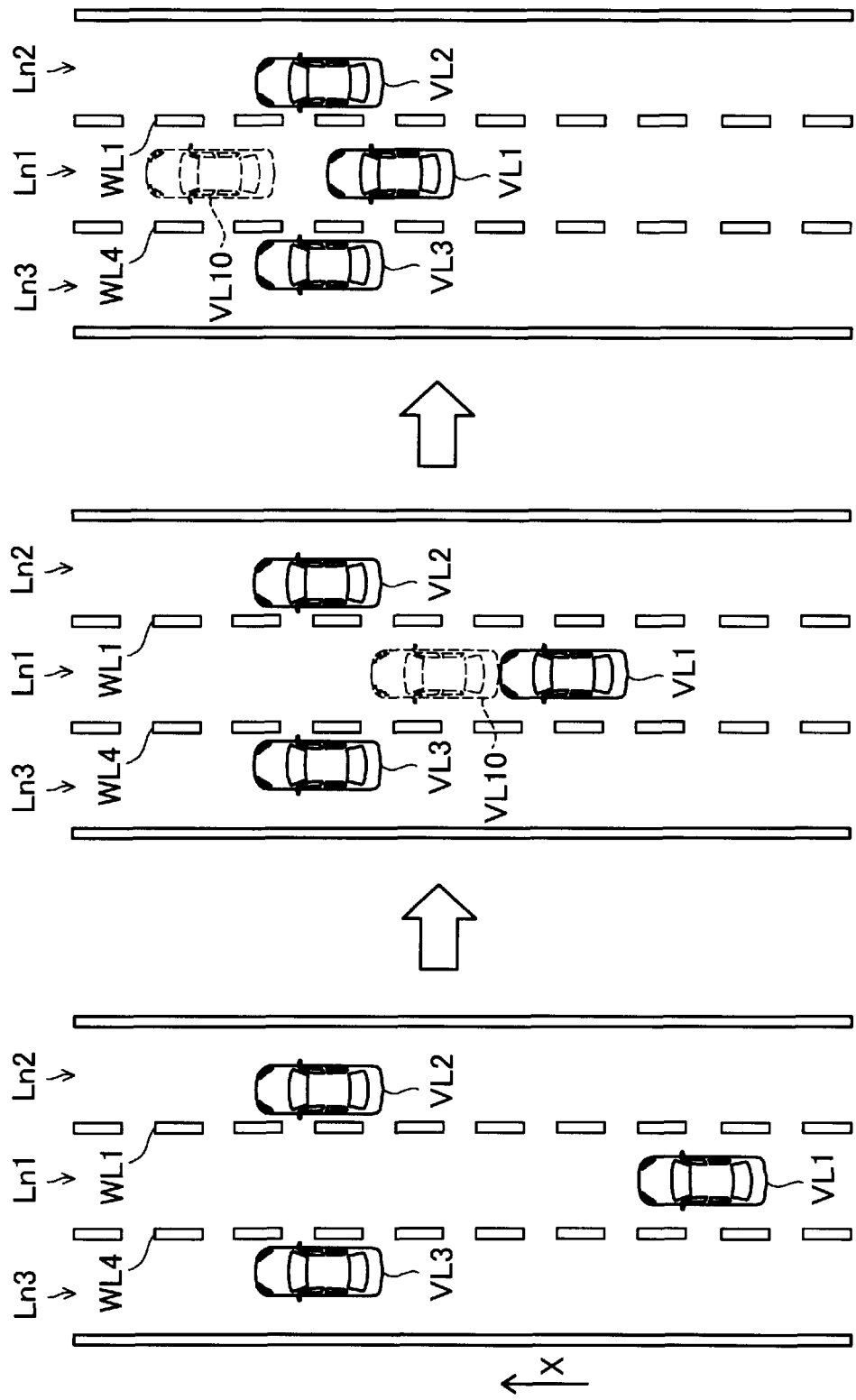
FIG. 11 is an explanatory diagram for explaining a manner in which the own vehicle passes a side of a target object.

In the example shown in FIG. 11, the other vehicle VL2 that is traveling in the adjacent lane Ln2 that is adjacent on the right side of the own traffic lane Ln1 and another vehicle VL3 that is traveling in an adjacent lane Ln3 that is adjacent on the left side of the own traffic lane Ln1 are shown as target objects of which the approach with the own vehicles VL1 and VL10 is presumed. In addition, the boundary line WL1 that is present between the own traffic lane Ln1 and the other vehicle VL2, and a boundary line WL4 that is preset between the own traffic lane Ln1 and the other vehicle VL3 are shown. The own vehicle VL1 and the other vehicles VL2 and VL3 are all traveling along the travelling direction X.

The other vehicles VL2 and VL3 are both traveling such as to be relatively close to the own traffic lane Ln1 side. Therefore, when traveling is continued under ordinary control as in the own vehicle VL10 of the comparison example indicated by the broken line, the relative speed becomes greater in magnitude than the second threshold speed as a result of the preset speed being great. The own vehicle VL10 passes the side of the other vehicles VL2 and VL3 at a high speed, and a passenger may experience uneasiness. In addition, as a result of the passenger experiencing uneasiness, brake override may be performed.

In this regard, in the own vehicle VL1 that travels at the target acceleration that is set in the acceleration setting process according to the present embodiment, when the current state is identified as being the approach-presumed state and the approach flag is set to ON in the approach identification process, the target acceleration is set to less than 0 until the point at which the travelling direction distance D2 becomes the passing start distance.

In addition, the target acceleration is set to 0 when the travelling direction distance D2 becomes the passing start distance. The own vehicle VL1 travels under constant speed control and passes the sides of the other vehicles VL2 and VL3 at a relative speed that is the second threshold speed. Therefore, the own vehicle VL1 passes the sides of the other vehicles VL2 and VL3 in a state in which the relative speed is less in magnitude than that of the own vehicle VL10 of the comparison example. Consequently, the uneasiness experienced by the passenger can be suppressed.

In the example shown in FIG. 12, an area that is adjacent on the left side of the own traffic lane Ln1 is a wall. Therefore, when a target object of which the approach is presumed is present ahead in the own traffic lane Ln1 and on the right side of the own traffic lane Ln1, moving the own vehicles VL1 and VL10 closer to the wall side by steering is difficult. Therefore, the other vehicle VL2 that is traveling along the travelling direction X in the adjacent traffic lane Ln2 that is adjacent on the right side of the own traffic lane Ln1 is indicated as the target object of which the approach with the own vehicles VL1 and VL10 is presumed. The other vehicle VL2 is traveling such as to be relatively close to the own traffic lane Ln1 side. Therefore, when traveling is continued under ordinary control as in the own vehicle VL10 of the comparison example indicated by the broken line, the passenger may experience uneasiness.

In this regard, the own vehicle VL1 that travels at the target acceleration that is set in the acceleration setting process according to the present embodiment travels under constant speed control and passes the side of the other vehicle VL2 at the relative speed that is the second threshold speed. Therefore, the own vehicle VL1 passes the side of the other vehicle VL2 in a state in which the relative speed is less in magnitude than that of the own vehicle VL10 of the comparison example, that is, at a low speed. Consequently, the uneasiness experienced by the passenger can be suppressed.

In the example in FIG. 13, a pedestrian P is present in a position that is extremely close to the boundary line WL2 ahead in the own traffic lane Ln1 and on the left side of the traffic lane Ln1. Therefore, a likelihood of the own vehicles VL1 and VL10 coming into contact when approaching the left side is high. Thus, the pedestrian P corresponds to the target object of which the approach with the own vehicles VL1 and VL10 is presumed.

In FIG. 13, a traffic lane that is adjacent on the right side of the own traffic lane Ln1 is an oncoming traffic lane Ln4 of which the travelling direction is a direction opposite the travelling direction X of the own traffic lane Ln1. Another vehicle VL4 that is traveling in the oncoming traffic lane Ln4 is shown. Here, the other vehicle VL4 may not be present. Another vehicle that is traveling in an adjacent traffic lane that is in a same direction as the travelling direction X of the own traffic lane Ln1 may be present.

Because the pedestrian P is present in a position that is extremely close to the boundary line WL2, when traveling is continued under ordinary control as in the own vehicle VL10 of the comparison example indicated by the broken line, the passenger may experience uneasiness when the own vehicle VL10 passes the side of the pedestrian P.

In this regard, the own vehicle VL1 that travels at the target acceleration that is set in the acceleration setting process according to the present embodiment travels under constant speed control and passes the side of the pedestrian P at the relative speed that is the second threshold speed. Therefore, because the own vehicle VL1 passes the side of the pedestrian P in a state in which the relative speed is less in magnitude than that of the own vehicle VL10 of the comparison example, that is, at a low speed, the uneasiness experienced by the passenger can be suppressed.

In the example shown in FIG. 14, a construction zone is present ahead in the own traffic lane Ln1 and on the left side of the own traffic lane Ln1. The construction zone differs from an ordinary road environment. Therefore, hazard assessment is difficult. Thus, the overall construction zone corresponds to the target object of which the approach with the own vehicles VL1 and VL10 is presumed.

In a manner similar to that in FIG. 13, in FIG. 14, the traffic lane that is adjacent on the right side of the own traffic lane Ln1 is the oncoming traffic lane Ln4 of which the travelling direction is the direction opposite the travelling direction X of the own traffic lane Ln1. The other vehicle VL4 that is traveling in the oncoming traffic lane Ln4 is shown. Here, the other vehicle VL4 may not be present. Another vehicle that is traveling in an adjacent traffic lane that is in a same direction as the travelling direction X of the own traffic lane Ln1 may be present.

Because the construction zone is present in a position that is extremely close to the boundary line WL2, when traveling is continued under ordinary control as in the own vehicle VL10 of the comparison example indicated by the broken line, the passenger may experience uneasiness when the own vehicle VL10 passes the side of the construction zone.

In this regard, the own vehicle VL1 that travels at the target acceleration that is set in the acceleration setting process according to the present embodiment travels under constant speed control and passes the side of the construction zone at the relative speed that is the second threshold speed. Therefore, because the own vehicle VL1 passes the side of the construction zone in a state in which the relative speed is less in magnitude than that of the own vehicle VL10 of the comparison example, that is, at a low speed, the uneasiness experienced by the passenger can be suppressed.

In the traveling control apparatus 10 according to the first embodiment described above, when a target object that is present ahead in the travelling direction X of the own vehicle VL1 and is not present in the own traffic lane Ln1 is detected and the relative speed is equal to or greater in magnitude than the first threshold speed, the own vehicle VL1 is made to travel and pass the side of the target object with the target acceleration set such that the relative speed is within the range from the first threshold speed to the second threshold speed. Therefore, the own vehicle VL1 can pass the side of the target object at a relative speed that is within a predetermined range. Uneasiness experienced by a passenger can be suppressed.

In addition, when the relative speed is greater in magnitude than the second threshold speed, the target acceleration is set to less than 0. Therefore, the own vehicle VL1 can be decelerated until the second threshold speed is reached. The speed at which the own vehicle VL1 passes the side of the target object can be made slower. In addition, when the relative speed is within the range from the first threshold speed to the second threshold speed, because the target acceleration is set to 0, the own vehicle VL1 can pass the side of the target object at a constant speed.

In addition, whether the current state is the predetermined approach-presumed state in which the approach between the own vehicle VL1 and the target object is presumed is identified by the approach identification process being performed. When the current state is identified as being the approach-presumed state, the target acceleration is set. When the current state is identified as not being the approach-presumed state, the target acceleration is not set.

Therefore, an unnecessary acceleration setting process being performed in a state in which the approach is not presumed can be suppressed. Unnecessary deceleration being performed, and the preset speed in ordinary control and the like not being met can be suppressed. Decrease in convenience to passengers can be suppressed.

Furthermore, when the distance between the own vehicle VL1 and the target object along the intersecting direction Y is equal to or less than the predetermined first distance, the current state is identified as being the approach-presumed state. Therefore, presumption of the approach can be accurately identified.

In addition, when the distance between the own vehicle VL1 and the target object along the travelling direction X is equal to or less than the predetermined second distance, the current state is identified as being the approach-presumed state. Therefore, presumption of the approach can be accurately identified.

In addition, when the relative speed of the target object relative to the own vehicle VL1 is equal to or less than the approach relative speed that is a predetermined negative value, the current state is identified as being the approach-presumed state. Therefore, presumption of the approach can be accurately identified.

Furthermore, when the boundary-line overlap ratio is equal to or greater than the predetermined approach overlap ratio, the current state is identified as being the approach-presumed state. Therefore, when the target object is sufficiently far from the own traffic lane Ln1 side, presumption of the approach being erroneously identified can be suppressed. Moreover, when the intention of the target object to change traffic lanes to the own traffic lane Ln1 is detected, the current state is identified as being the approach-presumed state. Therefore, the target object approaching by performing an operation to move closer to the own traffic lane Ln1 side to change traffic lanes can be accurately identified.

In addition, when the relative speed is greater in magnitude than the second threshold speed, the target acceleration is set such that the relative speed becomes the second threshold speed at the point at which the own vehicle VL1 approaches the target object and the travelling direction distance D2 becomes the passing start distance. Therefore, the relative speed can be set to the second threshold speed at a point at which a passenger recognizes the start of passing. Uneasiness experienced by the passenger can be suppressed.

B. Other Embodiments (1) The configuration of the traveling control apparatus 10 according to the above-described embodiment is merely an example. Various modifications are possible. For example, the target object detecting unit 11 detects a target object that is present ahead in the travelling direction X and is not present in the own traffic lane Ln1. However, a target object that is present ahead in the travelling direction X and is not present within an own vehicle width, instead of the own traffic lane Ln1, may be detected. That is, in general, the traveling control apparatus 10 may include the target object detecting unit 11 that detects a target object that is present ahead in the travelling direction X and is not present in the own traffic lane Ln1 or within the own vehicle width.

In addition, "a target object that is not present in the own traffic lane Ln1 or within the own vehicle width" may also include a target object of which a slight portion of the target object is present in the own traffic lane Ln1 or within the own vehicle width. As a result of this configuration as well, effects similar to those according to the above-described embodiment are achieved.

(2) Processing content of the approach identification process according to the above-described embodiment is merely an example. Various modifications are possible. For example, at least one of step S120 that is related to the intention of the target object to change traffic lanes, step S130 that is related to the intersecting-direction distance D1, and step S140 that is related to the travelling direction distance D2, step S150 that is related to the approach relative speed, and step S160 that is related to the boundary-line overlap ratio may be omitted.

In addition, for example, step S120, step S130, step S140, and step S150 may be performed in random order. Furthermore, for example, in addition to the above-described approach identification process, the approach between the own vehicle and a target object may be presumed based on a state in an area on a side opposite the target object with the own traffic lane Ln1 therebetween.

In addition, for example, an aspect in which a determination value for identifying that the current state is not the approach-presumed state is further used is possible. As an example according to this aspect, the current state may be identified as not being the approach-presumed state when the intersecting-direction distance D1 exceeds a predetermined distance, such as 1.75 m. The current state may be identified as not being the approach-presumed state when the travelling direction distance D2 exceeds a predetermined distance, such as 100 m.

Furthermore, the current state may be identified as not being the approach-presumed state when the relative speed is less in magnitude than a predetermined relative speed, such as a relative speed of −5 km/h. The current state may be identified as not being the approach-presumed state when the boundary-line overlap ratio is equal to or less than a predetermined boundary-line overlap ratio, such as −50%. According to this aspect, hunting during identification of whether the current state is the approach-presumed state can be suppressed.

In addition, for example, although the determination is performed based on the boundary-line overlap ratio at step S160 in the approach identification process, an aspect in which the determination is performed based on an amount of boundary-line lap, an amount of clearance to the boundary line WL1, or the like, instead of the boundary-line overlap ratio is also possible. According to this aspect, the current state may be identified as being the approach-presumed state when a distance between the target object and the boundary line WL1 along the intersecting direction Y is equal to or less than a third distance that is prescribed as one of the indicators that indicate the approach-presumed state.

That is, in general, a boundary line distance detecting unit that detects a distance between a target object and the boundary line WL1 along the intersecting direction Y that intersects the travelling direction X may be provided. When the distance between the target object and the boundary line WL1 along the intersecting distance Y is equal to or less than the predetermined third distance, the current state may be identified as being the approach-presumed state. According to this aspect as well, effects similar to those according to the above-described embodiment are achieved.

(3) Processing content of the acceleration setting process according to the above-described embodiment is merely an example. Various modifications are possible. For example, instead of step S210, whether a target object that is present ahead in the travelling direction X of the own vehicle VL1 and is not present in the own traffic lane Ln1 or within the own vehicle width is detected by the target object detecting unit 11 may be determined. In other words, the approach identification process may be omitted. As a result of this configuration as well, the effects similar to those according to the above-described embodiment are achieved.

In addition, for example, an aspect in which the second threshold speed is prescribed based on the type of the target object is also possible. For example, according to this aspect, the second threshold speed that is used when the target object is the pedestrian P may be set to a value that is less in magnitude than the second threshold speed that is used when the target object is the other vehicles VL2 and VL3.

According to this aspect, the speed when the own vehicle VL1 passes the side of the pedestrian P can be sufficiently slowed. The speed when the own vehicle VL1 passes the side of the other vehicles VL2 and VL3 becoming excessively slow can be suppressed. Therefore, the own vehicle VL1 can pass the side of the target object at a relative speed based on the type of the target object. Consequently, uneasiness experienced by a passenger can be appropriately suppressed based on the type of the target object, and decrease in convenience to the passenger can be suppressed.

Furthermore, for example, an aspect in which the second threshold speed is predetermined based on the intersecting-direction distance D1 between the own vehicle VL1 and the target object along the intersecting direction Y is also possible. According to this aspect, the second threshold speed may be prescribed to be a less value in magnitude as the intersecting-direction distance D1 decreases. According to this aspect, the speed when the own vehicle VL1 passes the side of the target object can be sufficiently slowed in a state in which a degree of approach between the own vehicle VL1 and the target object is great.

The speed when the own vehicle VL1 passes the side of the target object becoming excessively slow can be suppressed in a state in which the degree of approach between the own vehicle VL1 and the target object is small. Therefore, the own vehicle VL1 can pass the side of the target object at a relative speed that is based on the degree of approach between the own vehicle VL1 and the target object. Consequently, uneasiness experienced by a passenger can be appropriately suppressed based on the degree of approach, and decrease in convenience to the passenger can be suppressed.

In addition, for example, an aspect in which the passing start distance is prescribed based on the relative speed of the target object relative to the own vehicle VL1 and the speed of the own vehicle VL1 is also possible. According to this aspect, for example, the passing start distance may be set to a greater value as the relative speed increases in magnitude. The passing start distance may be set to a greater value as the second threshold speed that is set increases in magnitude.

According to this aspect, in a state in which the own vehicle VL1 is traveling at a high speed such as that which is highly likely to cause uneasiness in a passenger when the own vehicle VL1 passes the side of the target object, deceleration can be completed and the relative speed can become the second threshold speed before the own vehicle VL1 arrives at a point at which the travelling direction distance D2 to the target object is sufficiently great. Therefore, uneasiness experienced by a passenger can be further suppressed.

In addition, in a state in which the own vehicle VL1 is traveling at a low speed such as that which is unlikely to cause uneasiness in a passenger when the own vehicle VL1 passes the side of the target object, deceleration can be completed and the relative speed can become the second threshold speed before the own vehicle VL1 reaches a point at which the travelling direction distance D2 to the target object is relatively small.

Therefore, constant-speed traveling at the second threshold speed from a point at which the travelling direction distance D2 to the target object is excessively great can be suppressed. Decrease in convenience to the passenger can be suppressed. Consequently, because constant-speed traveling is performed from a point at which the passing start distance that is based on the relative speed and the speed is reached, uneasiness experienced by a passenger can be appropriately suppressed based on the relative speed and the speed. Decrease in convenience to the passenger can be suppressed.

Furthermore, for example, an aspect in which the first threshold speed and the second threshold speed are prescribed based on a road condition of the road on which the own vehicle VL1 is traveling is also possible. For example, the road condition may include conditions related to road type, such as a general road, an expressway, and a motorway, or may include conditions related to road gradient, speed limit, weather, or the like. That is, in general, at least either of the first threshold speed and the second threshold speed may be prescribed based on the road conditions of the road on which the own vehicle VL1 is traveling.

(4) In the acceleration setting process according to the above-described embodiment, the target acceleration is set to 0 when the relative speed is within the range from the first threshold speed to the second threshold speed. However, the present disclosure is not limited thereto.

For example, the target acceleration may be varied within the range from the first threshold speed to the second threshold speed. In addition, for example, when the relative speed before the approach flag is set to ON is less in magnitude than the first threshold speed and the acceleration of the own vehicle VL1 in ordinary control is a positive value, the target acceleration speed may be set to 0 after the relative speed becomes a value that is less than the first threshold speed.

Furthermore, for example, when the relative speed before the approach flag is set to ON is less than the second threshold speed, the target acceleration may be set to less than 0 and the relative speed may be less in magnitude than the second threshold speed. The target acceleration may be set to 0 after this relative speed is reached.

That is, in general, when the relative speed is equal to or greater in magnitude than the first threshold speed that is a predetermined negative value, the acceleration setting unit 13 may set the target acceleration such that the relative speed is within a range from the first threshold speed to the second threshold speed that is a predetermined negative value that is less than the first threshold speed. As a result of this configuration as well, effects similar to those according to the above-described embodiment are achieved.

(5) According to the embodiments, some of the configurations implemented by hardware may be replaced with software. Conversely, some of the configurations implemented by software may be replaced with hardware. For example, at least one functional unit among the target object detecting unit 11, the relative speed detecting unit 12, the acceleration setting unit 13, the traveling control unit 14, the approach identifying unit 20, the intersecting-direction distance detecting unit 21, the boundary line detecting unit 22, the boundary-line overlap ratio detecting unit 23, the travelling direction distance detecting unit 24, and the lane change detecting unit 25 may be implemented by an integrated circuit, a discrete circuit, or a module that combines these circuits. In addition, when some or all functions of the present disclosure are implemented by software, the software (computer program) can be provided so as to be stored in a computer-readable storage medium.

The "computer-readable storage medium" is not limited to a portable storage medium, such as a flexible disk or a compact disc-read only memory (CD-ROM). The computer-readable storage medium includes internal storage apparatuses inside a computer, such as various types of random access memory (RAM) and read-only memory (ROM), and external storage apparatuses mounted to the computer, such as a hard disk. That is, the "computer-readable storage medium" is broadly interpreted to include an arbitrary storage medium that is capable of storing data packets in a permanent manner rather than in a temporary manner.

The present disclosure is not limited to the above-described embodiments. The present disclosure can be implemented through various configurations without departing from the spirit of the disclosure. For example, technical features according to the embodiments that correspond to technical features according to aspects described in the summary of the invention can be replaced and combined as appropriate to solve some or all of the above-described issued or to achieve some or all of the above-described effects. Furthermore, the technical features may be omitted as appropriate unless described as a requisite in the present specification.

What is claimed is:

1. A traveling control apparatus that controls traveling of a vehicle, the traveling control apparatus comprising:
    a target object detecting unit that detects a target object that is present ahead in a travelling direction of an own vehicle and is not present in an own traffic lane or within an own vehicle width;
    a relative speed detecting unit that detects a relative speed of the target object relative to the own vehicle along the travelling direction, the relative speed being indicated by a negative value when the own vehicle approaches the target object and a positive value when the own vehicle moves away from the target object;
    an acceleration setting unit that sets a target acceleration of the own vehicle along the travelling direction; and
    a traveling control unit that enables the own vehicle to travel at the target acceleration that is set and to pass a side of the target object, wherein
    in response to the relative speed being equal to or greater in magnitude than a first threshold speed, which is a predetermined negative value, the acceleration setting unit sets the target acceleration to maintain the relative speed to be within a range from the first threshold speed to a second threshold speed, which is also a negative value that is greater in magnitude than the first threshold speed,
    the acceleration setting unit sets the target acceleration to less than 0 in response to the relative speed being greater in magnitude than the second threshold speed,
    the acceleration setting unit sets the target acceleration to 0 in response to the relative speed being within a range from the first threshold speed to the second threshold speed, and
    the second threshold speed is prescribed based on a type of the target object.

2. The traveling control apparatus according to claim 1, further comprising:
    an approach identifying unit that identifies whether a current state is a predetermined approach-presumed state in which an approach between the own vehicle and the target object is presumed, wherein
    the acceleration setting unit sets the target acceleration in response to the current state being identified as being the approach-presumed state and does not set the target acceleration in response to the current state being identified as not being the approach-presumed state.

3. The traveling control apparatus according to claim 2, further comprising:
    an intersecting-direction distance detecting unit that detects a distance between the own vehicle and the target object along an intersecting direction that intersects the travelling direction, wherein
    the approach identifying unit identifies that the current state is the approach-presumed state in response to the distance between the own vehicle and the target object along the intersecting direction being equal to or less than a predetermined first distance.

4. The traveling control apparatus according to claim 3, further comprising:
a travelling direction distance detecting unit that detects a distance between the own vehicle and the target object along the travelling direction, wherein
the approach identifying unit identifies that the current state is the approach-presumed state in response to the distance between the own vehicle and the target object along the travelling direction being equal to or less than a predetermined second distance.

5. The traveling control apparatus according to claim 4, wherein:
the approach identifying unit identifies that the current state is the approach-presumed state in response to the relative speed being equal to or greater in magnitude than an approach relative speed that is a predetermined negative value.

6. The traveling control apparatus according to claim 5, further comprising:
a boundary line detecting unit that detects a boundary line that is present between the own traffic lane and the target object; and
a boundary line distance detecting unit that detects a distance between the target object and the boundary line along an intersecting direction that intersects the travelling direction, wherein
the approach identifying unit identifies that the current state is the approach-presumed state in response to the distance between the target object and the boundary line along the intersecting direction being equal to or less than a predetermined third distance.

7. The traveling control apparatus according to claim 6, further comprising:
a lane change detecting unit that detects an intention by the target object to change traffic lanes to the own traffic lane, wherein
the approach identifying unit identifies that the current state is the approach-presumed state in response to the intention to change traffic lanes being detected.

8. The traveling control apparatus according to claim 2, further comprising:
a boundary line detecting unit that detects a boundary line that is present between the own traffic lane and the target object; and
a boundary line distance detecting unit that detects a distance between the target object and the boundary line along an intersecting direction that intersects the travelling direction, wherein
the approach identifying unit identifies that the current state is the approach-presumed state in response to the distance between the target object and the boundary line along the intersecting direction being equal to or less than a predetermined third distance.

9. The traveling control apparatus according to claim 2, further comprising:
a lane change detecting unit that detects an intention by the target object to change traffic lanes to the own traffic lane, wherein
the approach identifying unit identifies that the current state is the approach-presumed state in response to the intention to change traffic lanes being detected.

10. The traveling control apparatus according to claim 1, further comprising:
an intersecting-direction distance detecting unit that detects a distance between the own vehicle and the target object along an intersecting direction that intersects the travelling direction, wherein
the second threshold speed is predetermined based on the distance between the own vehicle and the target object along the intersecting direction, and prescribed to be a less value in magnitude as the distance decreases.

11. The traveling control apparatus according to claim 1, wherein:
at least either of the first threshold speed and the second threshold speed is prescribed based on a road condition of a road on which the own vehicle is traveling.

12. The traveling control apparatus according to claim 1, further comprising:
an approach identifying unit that identifies whether a current state is a predetermined approach-presumed state in which an approach between the own vehicle and the target object is presumed, wherein
the acceleration setting unit sets the target acceleration in response to the current state being identified as being the approach-presumed state and does not set the target acceleration in response to the current state being identified as not being the approach-presumed state.

13. The traveling control apparatus according to claim 12, further comprising:
a travelling direction distance detecting unit that detects a distance between the own vehicle and the target object along the travelling direction, wherein
the approach identifying unit identifies that the current state is the approach-presumed state in response to the distance between the own vehicle and the target object along the travelling direction being equal to or less than a predetermined second distance.

14. The traveling control apparatus according to claim 12, wherein:
the approach identifying unit identifies that the current state is the approach-presumed state in response to the relative speed being equal to or greater in magnitude than an approach relative speed that is a predetermined negative value.

* * * * *